US010189339B2

(12) United States Patent
Williamson et al.

(10) Patent No.: US 10,189,339 B2
(45) Date of Patent: Jan. 29, 2019

(54) TONNEAU COVER SYSTEM FOR A CARGO BED OF A VEHICLE

(71) Applicant: Rugged Liner, Inc., Owosso, MI (US)

(72) Inventors: Scott Williamson, Orlando, FL (US); David Kosinski, Northville, MI (US); Michael Yang, St. Charles, IL (US); Xichang Yan, Nanjing (CN); Jianfeng Tong, Nanjing (CN); Chengping Wei, Nanjing (CN); Ronald Brian Smith, Oxford, MI (US); Daniel David Burger, Bruce Township, MI (US); James Mays, Flint, MI (US)

(73) Assignee: Rugged Liner, Inc., Owosso, MI (US)

( * ) Notice: Subject to any disclaimer, the term of this patent is extended or adjusted under 35 U.S.C. 154(b) by 0 days.

(21) Appl. No.: 15/536,187

(22) PCT Filed: Apr. 25, 2017

(86) PCT No.: PCT/CN2017/081842
§ 371 (c)(1),
(2) Date: Jun. 15, 2017

(87) PCT Pub. No.: WO2018/018962
PCT Pub. Date: Feb. 1, 2018

(65) Prior Publication Data
US 2018/0147925 A1 May 31, 2018

Related U.S. Application Data

(60) Provisional application No. 62/414,384, filed on Oct. 28, 2016.

(30) Foreign Application Priority Data

Jul. 27, 2016 (CN) ........................... 2016 1 0597765
Jul. 27, 2016 (CN) ..................... 2016 2 0796716 U
Nov. 11, 2016 (CN) ..................... 2016 2 1215371 U

(51) Int. Cl.
B60J 7/14 (2006.01)
B60P 7/02 (2006.01)
B60J 10/90 (2016.01)

(52) U.S. Cl.
CPC ............... *B60J 7/141* (2013.01); *B60J 10/90* (2016.02); *B60P 7/02* (2013.01)

(58) Field of Classification Search
CPC ............... B60J 7/141; B60J 10/90; B60P 7/02
(Continued)

(56) References Cited

U.S. PATENT DOCUMENTS 4,607,876 A 8/1986 Reed
4,639,033 A 1/1987 Wheatley et al.
(Continued)

FOREIGN PATENT DOCUMENTS

CA 2 535 201 A1 8/2006
CA 2 746 916 A1 1/2012
(Continued)

OTHER PUBLICATIONS

International Search Report and Written Opinion, PCT/CN2017/081842, dated Jul. 27, 2017, international filing date Apr. 25, 2017.
(Continued)

*Primary Examiner* — Gregory A Blankenship
(74) *Attorney, Agent, or Firm* — The Dobrusin Law Firm, P.C.; Daniel P. Aleksynas

(57) ABSTRACT

A tonneau cover system includes a plurality of panels coupled to first and second side rails. The panels include a first panel, a second panel, a third panel, and a spacer bar with the spacer bar fixed to the side rails. The first panel pivots relative to the spacer while the spacer remains fixed to the side rails. The third panel pivots relative to the second
(Continued)

panel to permit the third panel to be located over the second panel while the spacer remains fixed to the side rails to define an intermediate folded position. The cover further includes a hinge assembly mounted between the second panel and the spacer to enable the second and third panels to pivot relative to the spacer as a unit from the intermediate position to a final position located at least over the spacer bar while the spacer bar remains fixed to the side rails.

20 Claims, 21 Drawing Sheets

(58) Field of Classification Search
USPC .................... 296/100.06, 100.08, 100.09
See application file for complete search history.

(56) References Cited

U.S. PATENT DOCUMENTS

| | | | |
|---|---|---|---|
| 4,730,866 A | 3/1988 | Nett | |
| 4,747,441 A * | 5/1988 | Apolzer | B60J 7/041 160/206 |
| 4,757,854 A | 7/1988 | Rippberger | |
| 4,838,602 A | 6/1989 | Nett | |
| 4,991,640 A | 2/1991 | Verkindt et al. | |
| 5,058,652 A | 10/1991 | Wheatley et al. | |
| 5,076,338 A | 12/1991 | Schmeichel et al. | |
| 5,096,250 A | 3/1992 | Menz | |
| 5,121,960 A | 6/1992 | Wheatley | |
| 5,165,750 A | 11/1992 | Pirhonen | |
| 5,174,353 A | 12/1992 | Schmeichel et al. | |
| 5,207,262 A | 5/1993 | Rushford | |
| 5,228,736 A | 7/1993 | Dutton | |
| 5,251,951 A | 10/1993 | Wheatley | |
| 5,275,458 A | 1/1994 | Barben et al. | |
| 5,301,913 A | 4/1994 | Wheatley | |
| 5,301,995 A | 4/1994 | Isler | |
| 5,310,238 A | 5/1994 | Wheatley | |
| 5,365,994 A | 11/1994 | Wheatley et al. | |
| 5,460,423 A | 10/1995 | Kersting et al. | |
| 5,472,256 A | 12/1995 | Tucker | |
| 5,487,585 A | 1/1996 | Wheatley | |
| 5,511,843 A | 4/1996 | Isler et al. | |
| 5,513,934 A | 5/1996 | German | |
| 5,636,893 A * | 6/1997 | Wheatley | B60J 7/141 16/354 |
| 5,653,491 A * | 8/1997 | Steffens | B60J 7/141 160/187 |
| 5,655,807 A | 8/1997 | Rosario | |
| 5,758,922 A | 6/1998 | Wheatley | |
| 5,765,903 A | 6/1998 | Essig et al. | |
| 5,772,273 A | 6/1998 | Wheatley | |
| 5,860,691 A | 1/1999 | Thomsen et al. | |
| 5,931,521 A * | 8/1999 | Kooiker | B60J 7/141 296/100.09 |
| 5,934,735 A | 8/1999 | Wheatley | |
| 6,024,401 A | 2/2000 | Wheatley et al. | |
| 6,053,556 A | 4/2000 | Webb | |
| 6,053,558 A | 4/2000 | Weldy et al. | |
| 6,059,350 A | 5/2000 | Kooiker | |
| 6,126,226 A | 10/2000 | Wheatley | |
| 6,209,366 B1 | 4/2001 | Zagoroff | |
| 6,234,561 B1 | 5/2001 | Huotari | |
| 6,257,306 B1 | 7/2001 | Weldy | |
| 6,257,647 B1 | 7/2001 | Ninness et al. | |
| 6,293,608 B1 | 9/2001 | Dicke et al. | |
| 6,309,006 B1 | 10/2001 | Rippberger | |
| 6,322,129 B2 | 11/2001 | Huotari | |
| 6,386,616 B1 | 5/2002 | Wheatley | |
| 6,422,635 B1 * | 7/2002 | Steffens | B60J 7/141 296/100.09 |
| 6,439,640 B1 | 8/2002 | Wheatley | |
| 6,454,337 B2 | 9/2002 | Steffens et al. | |
| 6,499,791 B2 | 12/2002 | Wheatley | |
| 6,520,559 B1 | 2/2003 | Steffens et al. | |
| 6,527,330 B1 | 3/2003 | Steffens et al. | |
| 6,543,835 B2 | 4/2003 | Schmeichel et al. | |
| 6,543,836 B1 | 4/2003 | Wheatley | |
| 6,547,310 B2 | 4/2003 | Myers | |
| 6,565,141 B1 | 5/2003 | Steffens et al. | |
| 6,568,740 B1 | 5/2003 | Dimmer | |
| 6,575,520 B1 | 6/2003 | Spencer | |
| 6,585,309 B2 | 7/2003 | Dicke | |
| 6,588,825 B1 | 7/2003 | Wheatley | |
| 6,607,234 B1 | 8/2003 | Schmeichel | |
| 6,619,719 B1 | 9/2003 | Wheatley | |
| 6,669,264 B1 | 12/2003 | Tucker | |
| 6,672,644 B2 | 1/2004 | Schmeichel | |
| 6,688,668 B2 | 2/2004 | Stevens et al. | |
| 6,719,353 B1 | 4/2004 | Isler et al. | |
| 6,722,096 B2 | 4/2004 | Von Arx et al. | |
| 6,752,449 B1 | 6/2004 | Wheatley | |
| 6,808,220 B2 | 10/2004 | Wheatley | |
| 6,808,221 B2 | 10/2004 | Wheatley | |
| 6,811,203 B2 | 11/2004 | Wheatley | |
| 6,814,388 B2 | 11/2004 | Wheatley | |
| 6,814,389 B2 | 11/2004 | Wheatley | |
| 6,824,191 B2 | 11/2004 | Wheatley | |
| 6,851,738 B1 | 2/2005 | Schmeichel et al. | |
| 6,857,683 B2 | 2/2005 | Myers | |
| 6,893,073 B2 | 5/2005 | Wheatley | |
| 6,953,312 B1 | 10/2005 | Wheatley | |
| 6,976,724 B2 | 12/2005 | Wheatley | |
| 7,008,000 B1 | 3/2006 | Schmeichel | |
| 7,011,284 B2 | 3/2006 | Melius | |
| 7,025,403 B2 | 4/2006 | Wheatley | |
| 7,037,057 B1 | 5/2006 | Wheatley | |
| 7,048,277 B1 | 5/2006 | Schmeichel | |
| 7,052,071 B2 | 5/2006 | Mulder et al. | |
| 7,066,524 B2 | 6/2006 | Schmeichel et al. | |
| 7,104,586 B2 | 9/2006 | Schmeichel et al. | |
| 7,150,490 B2 | 12/2006 | Malmberg et al. | |
| 7,165,803 B2 | 1/2007 | Malmberg et al. | |
| 7,188,888 B2 | 3/2007 | Wheatley et al. | |
| 7,204,540 B2 | 4/2007 | Wheatley | |
| 7,252,322 B2 * | 8/2007 | Rusu | B60J 7/1621 296/100.07 |
| 7,258,387 B2 | 8/2007 | Weldy | |
| 7,334,830 B2 | 2/2008 | Weldy | |
| 7,384,090 B1 | 6/2008 | Weldy | |
| 7,427,095 B2 | 9/2008 | Wheatley | |
| 7,445,264 B2 | 11/2008 | Spencer et al. | |
| 7,472,941 B2 | 1/2009 | Schmeichel et al. | |
| 7,484,788 B2 | 2/2009 | Calder et al. | |
| 7,484,790 B2 | 2/2009 | Wheatley | |
| 7,537,264 B2 | 5/2009 | Maimin et al. | |
| 7,604,282 B2 | 10/2009 | Spencer et al. | |
| 7,607,714 B2 | 10/2009 | Wheatley | |
| 7,621,582 B2 | 11/2009 | Schmeichel et al. | |
| 7,628,442 B1 | 12/2009 | Spencer et al. | |
| RE41,078 E | 1/2010 | Schmeichel | |
| 7,735,881 B2 | 6/2010 | Steffens et al. | |
| RE41,724 E | 9/2010 | Myers | |
| 7,815,239 B1 | 10/2010 | Schmeichel et al. | |
| 7,828,361 B1 | 11/2010 | Spencer | |
| 7,887,114 B2 | 2/2011 | Spencer | |
| 7,905,536 B2 | 3/2011 | Yue | |
| 8,033,591 B2 | 10/2011 | Schmeichel et al. | |
| 8,061,758 B2 | 11/2011 | Maimin et al. | |
| 8,083,281 B2 | 12/2011 | Schmeichel et al. | |
| 8,128,149 B1 | 3/2012 | Wolf et al. | |
| 8,146,981 B2 | 4/2012 | Huotari et al. | |
| 8,167,353 B2 | 5/2012 | Schmeichel et al. | |
| 8,182,021 B2 | 5/2012 | Maimin et al. | |
| 8,186,740 B2 | 5/2012 | Huotari et al. | |
| 8,205,928 B2 | 6/2012 | Steffens et al. | |
| 8,256,820 B2 | 9/2012 | Spencer | |
| 8,262,148 B2 * | 9/2012 | Rusher | B60J 7/141 296/100.06 |
| 8,308,218 B2 | 11/2012 | Kneifl et al. | |
| 8,328,267 B2 | 12/2012 | Schmeichel et al. | |
| 8,336,946 B2 | 12/2012 | Schrader et al. | |
| 8,348,328 B2 | 1/2013 | Walser et al. | |

(56) References Cited

U.S. PATENT DOCUMENTS

| | | |
|---|---|---|
| 8,439,423 B2 | 5/2013 | Schmeichel et al. |
| 8,475,096 B2 | 7/2013 | Spencer et al. |
| 8,480,154 B2 | 7/2013 | Yue |
| 8,523,266 B2 | 9/2013 | Yue |
| 8,567,843 B2 | 10/2013 | Schmeichel et al. |
| 8,573,678 B2 | 11/2013 | Yue |
| 8,585,120 B2 | 11/2013 | Rusher et al. |
| 8,596,708 B2 | 12/2013 | Schmeichel |
| 8,632,114 B2 | 1/2014 | Yue |
| 8,632,211 B2 | 1/2014 | Cho |
| 8,641,124 B1 | 2/2014 | Yue |
| 8,657,542 B2 | 2/2014 | Liu et al. |
| 8,672,388 B2 | 3/2014 | Rusher et al. |
| 8,714,622 B2 | 5/2014 | Spencer et al. |
| 8,814,249 B2 | 8/2014 | Rossi |
| 8,857,887 B1 | 10/2014 | Schmeichel |
| 8,939,494 B2 | 1/2015 | Maimin et al. |
| 8,960,764 B2 | 2/2015 | Spencer |
| 8,960,765 B2* | 2/2015 | Facchinello ............. B60J 7/141 |
| | | 296/100.06 |
| 9,039,066 B1 | 5/2015 | Yue |
| 9,045,069 B2 | 6/2015 | Schmeichel et al. |
| 9,056,542 B2 | 6/2015 | Schmeichel |
| 9,067,481 B2 | 6/2015 | Ku |
| 9,120,413 B2 | 9/2015 | Fink |
| 9,211,833 B2 | 12/2015 | Rusher et al. |
| 9,211,834 B2 | 12/2015 | Facchinello et al. |
| 9,221,380 B2 | 12/2015 | Spencer et al. |
| 9,254,735 B2 | 2/2016 | Spencer |
| 9,260,139 B2 | 2/2016 | Schmeichel |
| 9,278,611 B2 | 3/2016 | Maimin et al. |
| 9,290,122 B2 | 3/2016 | Spencer |
| 9,333,842 B2 | 5/2016 | Yue |
| 9,643,479 B1* | 5/2017 | Zheng ...................... B60J 10/90 |
| 9,895,963 B1* | 2/2018 | Spencer ................... B60J 7/141 |
| 2002/0096910 A1 | 7/2002 | Schmeichel et al. |
| 2004/0124658 A1 | 7/2004 | Wheatley |
| 2004/0245799 A1* | 12/2004 | Rusu ...................... B62D 25/10 |
| | | 296/100.06 |
| 2005/0099033 A1* | 5/2005 | Chverchko ............ B60J 7/1621 |
| | | 296/100.09 |
| 2006/0012211 A1 | 1/2006 | Keller |
| 2007/0205629 A1 | 9/2007 | Wheatley |
| 2007/0210609 A1* | 9/2007 | Maimin ................... B60J 7/141 |
| | | 296/100.09 |
| 2008/0100088 A1* | 5/2008 | Calder .................... B60J 7/141 |
| | | 296/100.09 |
| 2008/0129077 A1 | 6/2008 | Weldy |
| 2009/0146449 A1* | 6/2009 | Steffens .................. B60J 7/141 |
| | | 296/100.07 |
| 2013/0015678 A1* | 1/2013 | Williamson ........... B60J 7/1607 |
| | | 296/100.09 |
| 2013/0093206 A1 | 4/2013 | Rusher et al. |
| 2013/0106134 A1 | 5/2013 | Spencer et al. |
| 2014/0042754 A1 | 2/2014 | Spencer |
| 2014/0042769 A1 | 2/2014 | Spencer |
| 2014/0312645 A1 | 10/2014 | Maimin |
| 2015/0054300 A1 | 2/2015 | Shi et al. |
| 2015/0061315 A1* | 3/2015 | Facchinello .............. B60P 7/02 |
| | | 296/100.07 |
| 2015/0145277 A1 | 5/2015 | Shi et al. |
| 2015/0224862 A1 | 8/2015 | Yue |
| 2015/0246602 A1 | 9/2015 | Schmeichel et al. |
| 2015/0321543 A1 | 11/2015 | Fink |
| 2016/0059682 A1 | 3/2016 | Rusher et al. |
| 2016/0075220 A1 | 3/2016 | Williamson et al. |
| 2016/0096421 A1 | 4/2016 | Facchinello et al. |
| 2016/0096422 A1 | 4/2016 | Facchinello et al. |
| 2016/0096423 A1 | 4/2016 | Facchinello et al. |
| 2016/0107515 A1 | 4/2016 | Shi et al. |
| 2016/0137042 A1 | 5/2016 | Maimin et al. |
| 2016/0280123 A1 | 9/2016 | Rohr et al. |

FOREIGN PATENT DOCUMENTS

| | | |
|---|---|---|
| CA | 2914607 A1 | 4/2016 |
| CN | 101400532 A | 4/2009 |
| CN | 201534517 U | 7/2010 |
| CN | 103612591 A | 3/2014 |
| CN | 204249894 U | 4/2015 |
| CN | 205010076 U | 2/2016 |
| CN | 105620343 A | 6/2016 |
| CN | 205836642 U | 12/2016 |
| WO | WO 2013/056124 A1 | 4/2013 |
| WO | WO 2016/066132 A1 | 5/2016 |
| WO | WO 2016/070276 A1 | 5/2016 |

OTHER PUBLICATIONS

Potentially related application, U.S. Appl. No. 15/536,157, filed Jun. 15, 2017.

U.S. Appl. No. 15/536,157, filed Jun. 15, 2017, 103 pages.

* cited by examiner

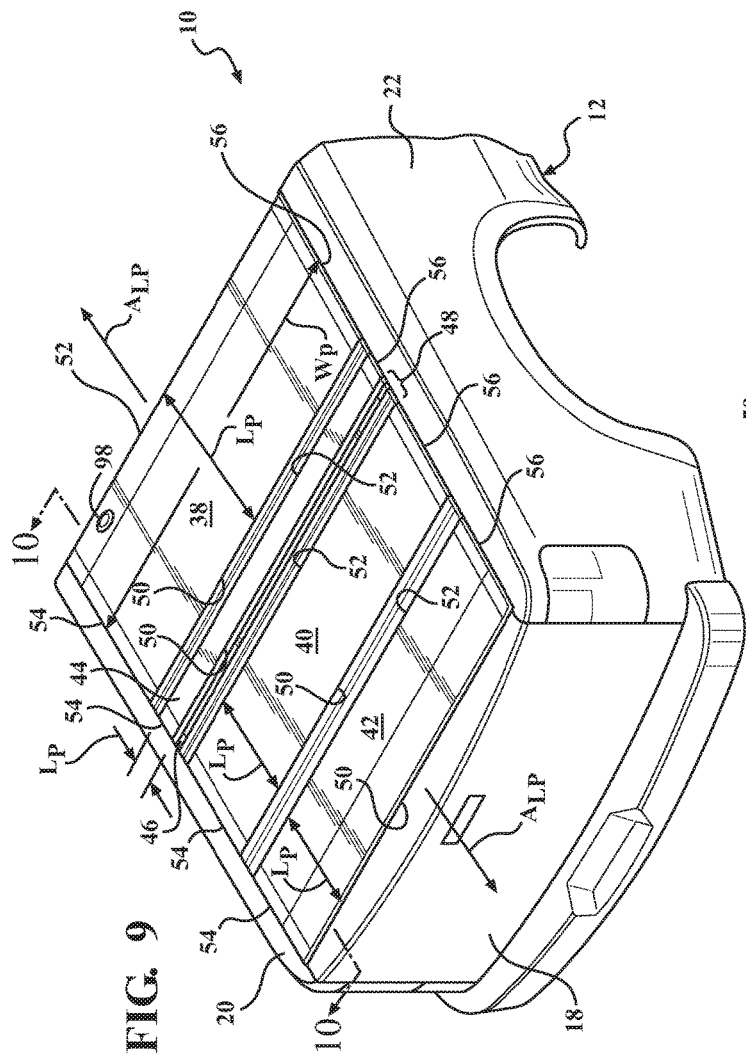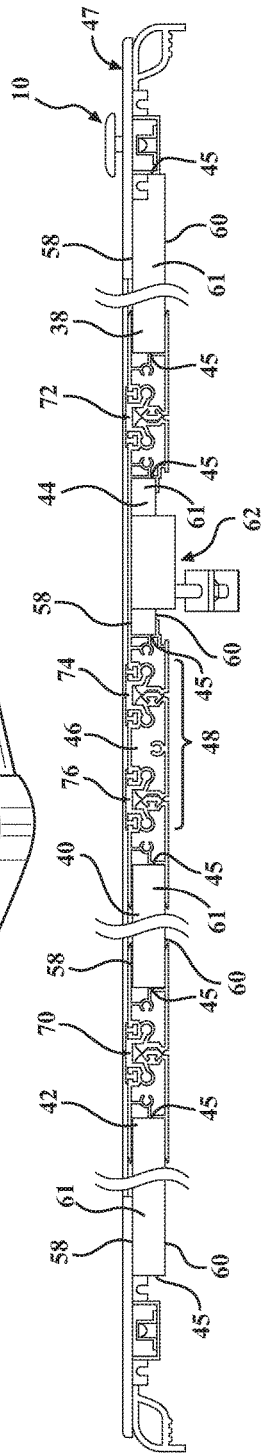

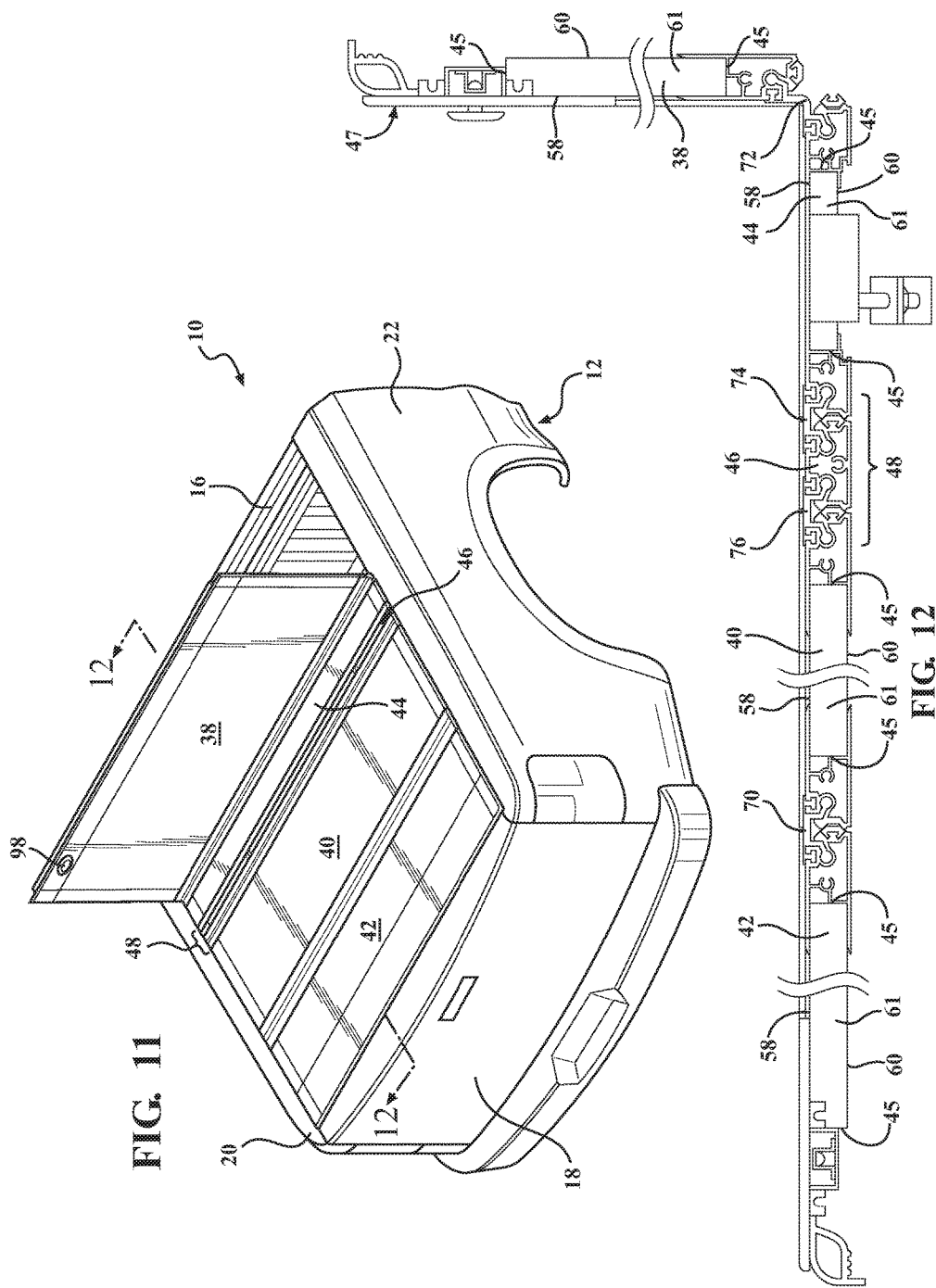

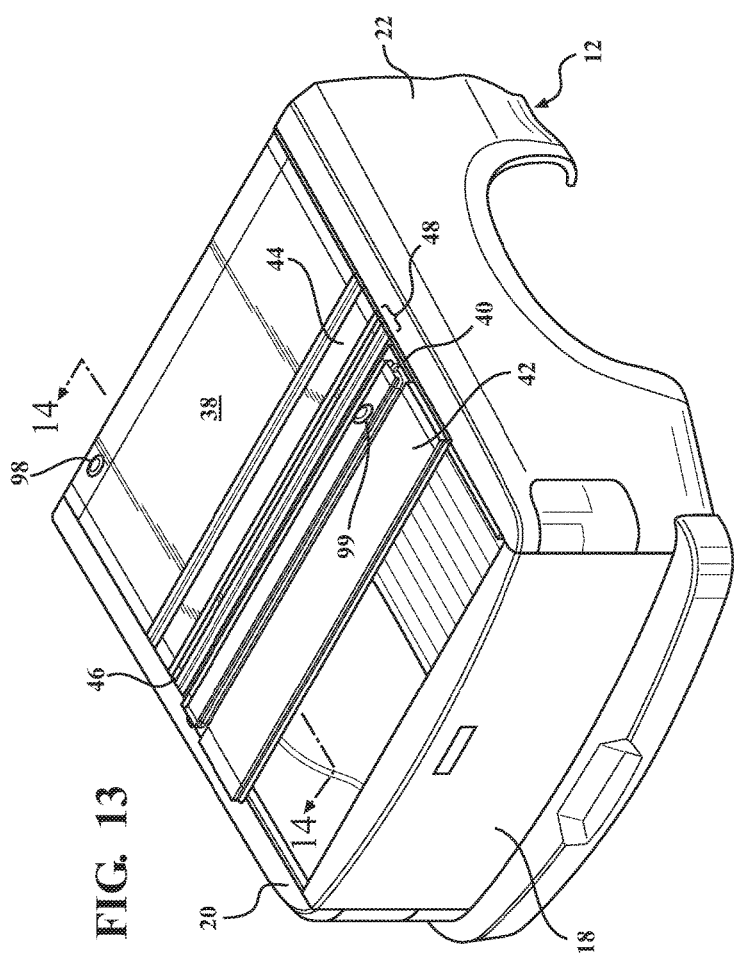
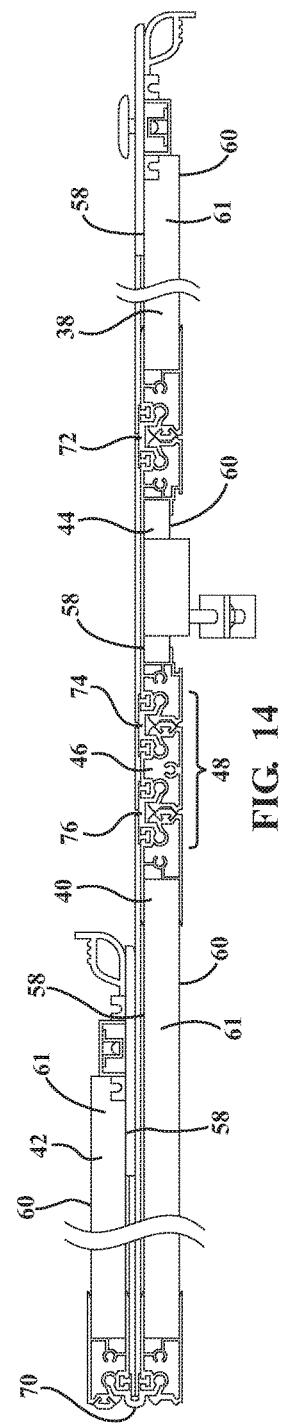

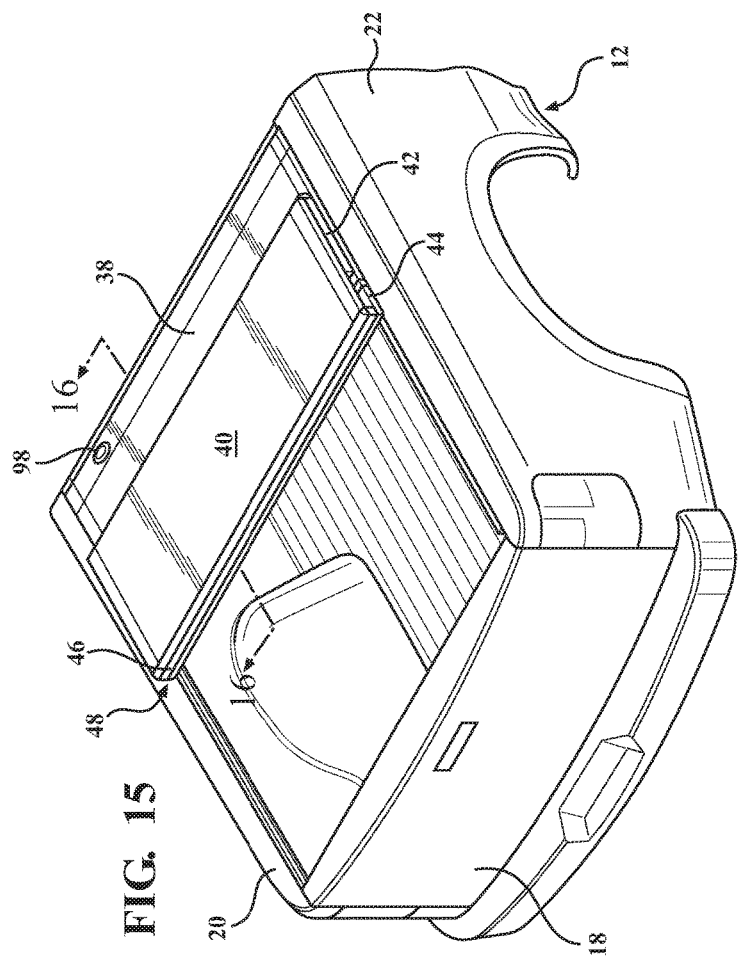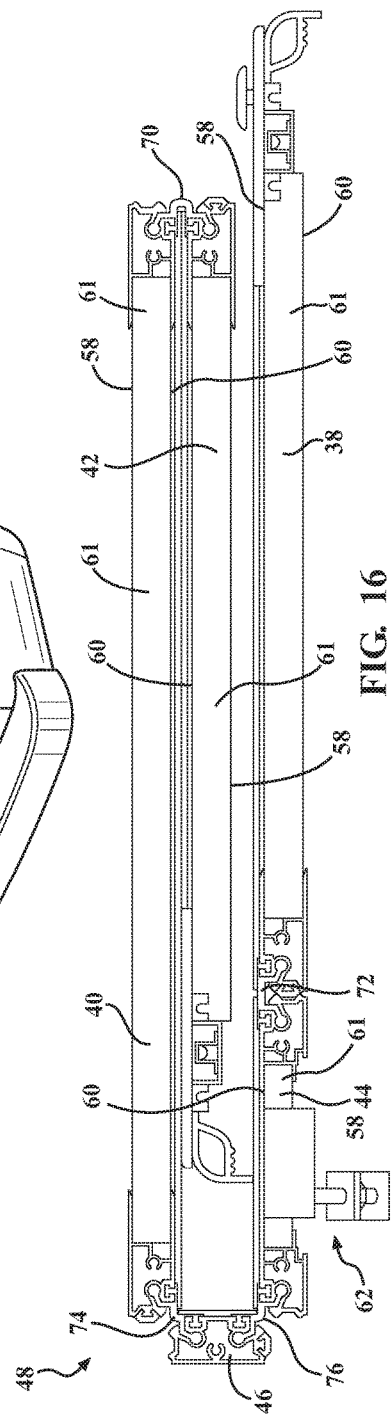

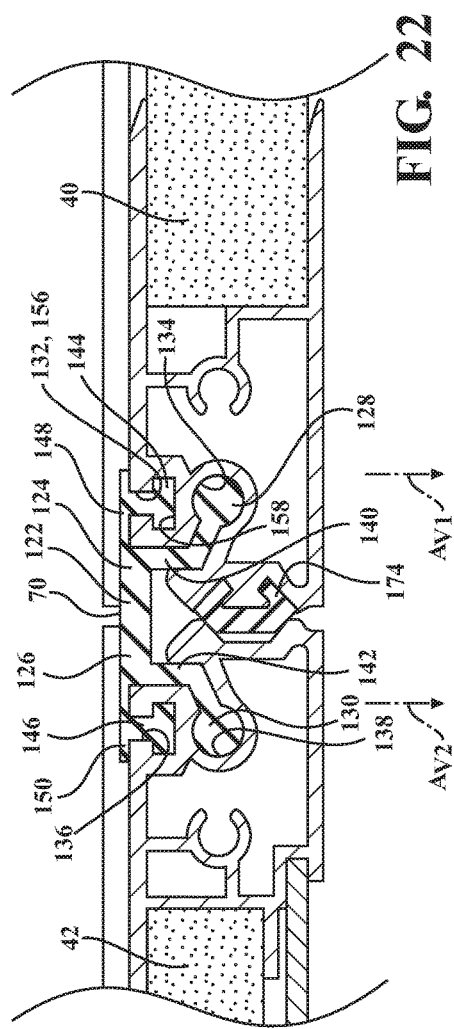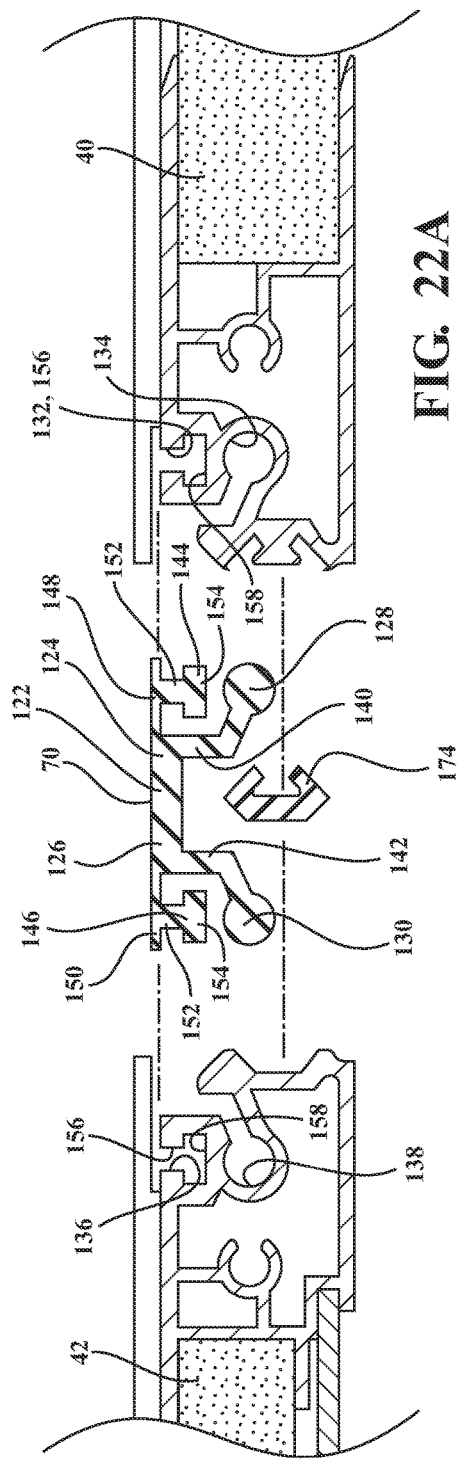

TONNEAU COVER SYSTEM FOR A CARGO BED OF A VEHICLE

CROSS REFERENCE TO RELATED APPLICATIONS

The subject application is the National Stage of International Application No. PCT/CN2017/081842 filed on Apr. 25, 2017, which claims priority to and all of the benefits of Chinese Application No. 201610597765.7 filed on Jul. 27, 2016, Chinese Application No. 201620796716.1 filed on Jul. 27, 2016, U.S. Provisional Application No. 62/414,384 filed Oct. 28, 2016, and Chinese Application No. 201621215371.2 filed on Nov. 11, 2016, the contents of which are expressly incorporated herein in their entirety.

FIELD OF THE INVENTION

The present disclosure relates generally to a tonneau cover system for a cargo bed of a vehicle.

BACKGROUND

Tonneau covers are often used for covering a cargo bed of a vehicle, such as a pickup truck. The tonneau cover typically adds to the aesthetic appeal of the vehicle, and protects the cargo bed from dirt, debris, foreign objects, and/or the like. Although current tonneau cover designs are suitable for their intended purpose, there remains an opportunity to provide a tonneau cover with improved accessibility to the cargo bed of the vehicle. There also remains an opportunity to provide a tonneau cover with improved water management.

SUMMARY

In one embodiment of the present disclosure, a tonneau cover system for a cargo bed of a vehicle comprises first and second side rails each adapted to be mounted to the vehicle, and a plurality of panels coupled to the side rails. The plurality of panels comprises a first panel, a second panel spaced from the first panel, a third panel adjacent the second panel, and a spacer bar disposed between the first and second panels with the spacer bar being fixed to the first and second side rails. The first panel is pivotally coupled to the spacer bar to enable the first panel to pivot relative to the spacer bar while the spacer bar remains fixed to the side rails. The third panel is pivotally coupled to the second panel to enable the third panel to pivot relative to the second panel and to permit the third panel to be located over the second panel while the spacer bar remains fixed to the side rails to define an intermediate folded position of the tonneau cover system. The tonneau cover system further comprises a hinge assembly mounted between the second panel and the spacer bar to enable the second and third panels to pivot relative to the spacer bar as a unit from the intermediate folded position to a final folded position located over the spacer bar and a portion of the first panel while the spacer bar remains fixed to the side rails.

In another embodiment of the present disclosure, a tonneau cover system for covering a cargo bed of a vehicle comprises first and second side rails each adapted to be mounted to the vehicle, and a plurality of panels coupled to the side rails. The plurality of panels comprises a first panel, a second panel spaced from the first panel, a third panel pivotally coupled to the second panel, a fourth panel disposed between the first and second panels with the fourth panel being fixed to the first and second side rails, and a fifth panel. The tonneau cover system further comprises a first hinge mounted to the second and third panels to enable the third panel to pivot relative to the second panel and to permit the third panel to be located over the second panel while the fourth panel remains fixed to the side rails to define an intermediate folded position of the tonneau cover system, a second hinge mounted to the first and fourth panels to enable the first panel to pivot relative to the fourth panel while the fourth panel remains fixed to the side rails, and a hinge assembly having the fifth panel, a third hinge mounted to the fourth and fifth panels, and a fourth hinge mounted to the second and fifth panels such that the hinge assembly is mounted between the second and fourth panels to enable the second and third panels to pivot relative to the fourth panel as a unit from the intermediate folded position to a final folded position located over the fourth panel and a portion of the first panel while the fourth panel remains fixed to the side rails.

In another embodiment of the present disclosure, a vehicle comprises a cargo bed having a header, a tailgate, and opposing sides, and a plurality of panels coupled to the cargo bed. The plurality of panels comprises a first panel, a second panel spaced from the first panel, a third panel pivotally coupled to the second panel, a fourth panel disposed between the first and second panels with the fourth panel being fixedly coupled to the opposing sides of the cargo bed, and a fifth panel. The tonneau cover system further comprises a first hinge mounted to the second and third panels to enable the third panel to pivot relative to the second panel and to permit the third panel to be located over the second panel while the fourth panel remains fixedly coupled to the opposing sides of the cargo bed to define an intermediate folded position of the cover assembly, a second hinge mounted to the first and fourth panels to enable the first panel to pivot relative to the fourth panel while the fourth panel remains fixedly coupled to the opposing sides of the cargo bed, and a hinge assembly having the fifth panel, a third hinge mounted to the fourth and fifth panels, and a fourth hinge mounted to the second and fifth panels such that the hinge assembly is mounted between the second and fourth panels to enable the second and third panels to pivot relative to the fourth panel as a unit from the intermediate folded position to a final folded position located over the fourth panel and a portion of the first panel while the fourth panel remains fixedly coupled to the opposing sides of the cargo bed.

In another embodiment of the present disclosure, a tonneau cover apparatus for a vehicle comprises a plurality of panels, and a hinge mounted to adjacent panels of said plurality of panels to enable one of the adjacent panels to pivot relative to another of the adjacent panels. The hinge has a body formed of an elastomeric material and having first and second portions, a first securing member integral with and extending from the first portion of the body with the first securing member engaged with one of the adjacent panels, a second securing member integral with and extending from the second portion of the body with the second securing member engaged with another of the adjacent panels, and a plurality of barbs extending from the body with the barbs engaging the adjacent panels to form a seal between the body of the hinge and the adjacent panels.

In still another embodiment of the present disclosure, a tonneau cover apparatus for a vehicle comprises a plurality of panels each having a periphery and each having a frame disposed about at least a portion of the periphery with the frame defining upper and lower cavities, and a hinge mounted to adjacent panels of the plurality of panels with the hinge enabling one of the adjacent panels to pivot relative to another of the adjacent panels. The hinge comprises an elastomeric body having first and second portions, first and third securing members integral with and extending from the first portion of the elastomeric body with at least a portion of the first securing member disposed within the lower cavity defined in the frame and one of the adjacent panels and at least a portion of the third securing member disposed within the upper cavity defined in the frame of the one of the adjacent panels such that the first and third securing members engage the one of the adjacent panels, and second and fourth securing members integral with and extending from the second portion of the elastomeric body with at least a portion of the second securing member disposed within the lower cavity defined in the frame of another of the adjacent panels and at least a portion of the fourth securing member disposed within the upper cavity defined in the frame of the other of the adjacent panels such that the second and fourth securing members engage the other of the adjacent panels.

BRIEF DESCRIPTION OF THE DRAWINGS

The advantages of the present disclosure will be readily appreciated as the same becomes better understood by reference to the following detailed description when considered in connection with the accompanying drawings. It is to be understood that the drawings are purely illustrative and are not necessarily drawn to scale.

FIG. 9 is a semi-schematic, perspective view of the cargo bed of the vehicle with the plurality of panels disposed over and covering the cargo bed. The plurality of panels includes first, second, third, and fourth panels, with each of the first, second, and third panels in a closed position.

FIG. 10 is a cross-sectional view of the plurality of panels taken along line 10-10 in FIG. 9. Cross-hatching has been removed from FIG. 10 for purposes of simplifying the drawing.

FIG. 11 is a semi-schematic, perspective view of the cargo bed of the vehicle with the plurality of panels disposed over and partially covering the cargo bed, with the first panel in an opened position and each of the second and third panels in the closed position.

FIG. 12 is a cross-sectional view of the cover assembly taken along line 12-12 in FIG. 11. Cross-hatching has been removed from FIG. 12 for purposes of simplifying the drawing.

FIG. 13 is a semi-schematic, perspective view of the cargo bed of the vehicle with the plurality of panels disposed over and partially covering the cargo bed, with the third panel in the opened position and each of the first and second panels in the closed position. FIG. 13 also illustrates the third panel located over the second panel to define an intermediate folded position of the tonneau cover system.

FIG. 14 is a cross-sectional view of the cover assembly taken along line 14-14 in FIG. 13. Cross-hatching has been removed from FIG. 14 for purposes of simplifying the drawing.

FIG. 15 is a semi-schematic, perspective view of the cargo bed of the vehicle with the plurality of panels disposed over and partially covering the cargo bed, with the second and third panels in an opened position and the first panel in the closed position. FIG. 15 also illustrates the second and third panels, as a unit, located over the fourth panel and a portion of the first panel to define a final folded position of the tonneau cover system.

FIG. 16 is a cross-sectional view of the cover assembly taken along line 16-16 of FIG. 15. Cross-hatching has been removed from FIG. 16 for purposes of simplifying the drawing.

FIG. 17 also illustrates the mounting mechanism in a locked position.

FIG. 18 also illustrates the mounting mechanism in a stowed position.

FIG. 19 also illustrates a rearward release device accessible from the bottom of the third panel for moving the latch mechanism from a latch position to an unlatch position.

FIG. 20 also illustrates a forward release device accessible from the bottom of the first panel for moving the latch mechanism from a latch position to an unlatch position.

FIG. 22 is a cross-sectional view of the second panel pivotally coupled to the third panel by another single hinge.

FIG. 22A is an exploded view of the cross-section shown in FIG. 22.

DETAILED DESCRIPTION

Figure 1:
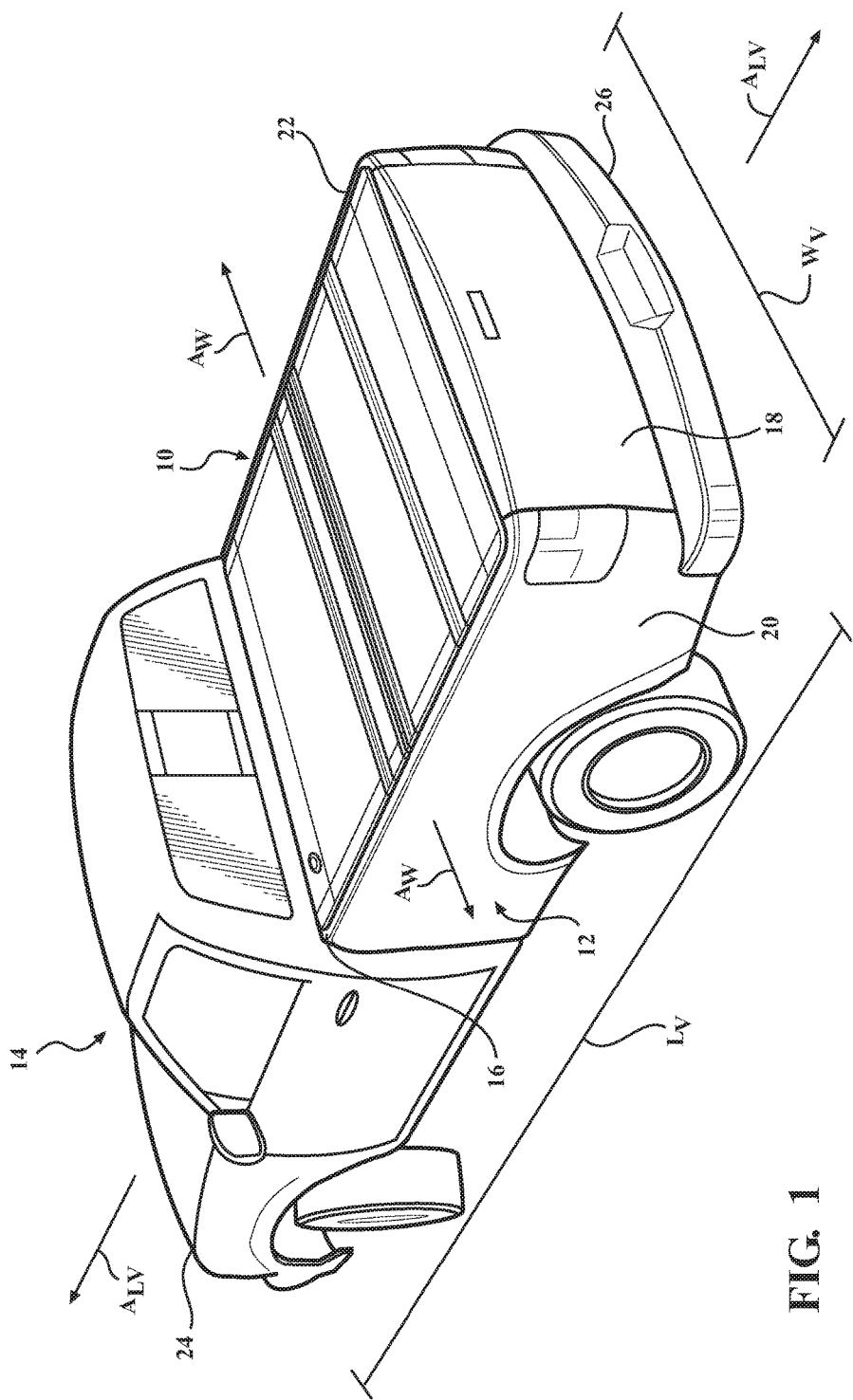
FIG. 1 is a semi-schematic perspective view of a vehicle including a cargo bed with an embodiment of a tonneau cover system disposed over and covering the cargo bed.

Referring now to the figures, wherein like numerals indicate corresponding parts throughout the several views, embodiments of a tonneau cover system 10 are shown throughout the figures and are described in detail below. As described herein, the tonneau cover system 10 may be disposed over and at least partially cover a cargo bed 12 of a vehicle 14. In one example, the vehicle 14 is a pickup truck including the cargo bed 12, and the tonneau cover system 10 is disposed over and at least partially covers the cargo bed 12. As shown at least in FIGS. 1 and 2, the cargo bed 12 has a header 16, a tailgate 18, and opposing sides 20, 22, and the tonneau cover system 10 is disposed over and coupled to the opposing sides 20, 22. The cargo bed 12 has a width $W_{CB}$ extending between the opposing sides 20, 22, and a length $L_{CB}$ extending between the header 16 and the tailgate 18. The vehicle 14 has a front end 24 and a tail end 26, and the vehicle 14 has a length $L_V$ extending between the front 24 and tail 26 ends. The vehicle 14 further has a width $W_V$ extending between the opposing sides 20, 22 of the cargo bed 12. As shown, the width $W_V$ of the vehicle 14 is the same as the width $W_{CB}$ of the cargo bed 12. The vehicle 14 further defines a longitudinal axis $A_{LV}$ extending along the length $L_V$ of the vehicle 14, and a width-wise axis $A_W$ extending along the width $W_V$ of the vehicle 14.

The tonneau cover system 10 is described in detail below as being coupled to the cargo bed 12 of the vehicle 14. It is to be appreciated, however, that the tonneau cover system 10 could alternatively be used for covering another space defined by the vehicle 14, not limited to the cargo bed 12. For instance, the tonneau cover system 10 could be used for covering a passenger compartment of a vehicle, a storage compartment of a vehicle, etc. It is also to be appreciated that the tonneau cover system 10 can be used for other purposes not specifically related to vehicles, such as for homes, buildings, boats, etc.

Figure 2:
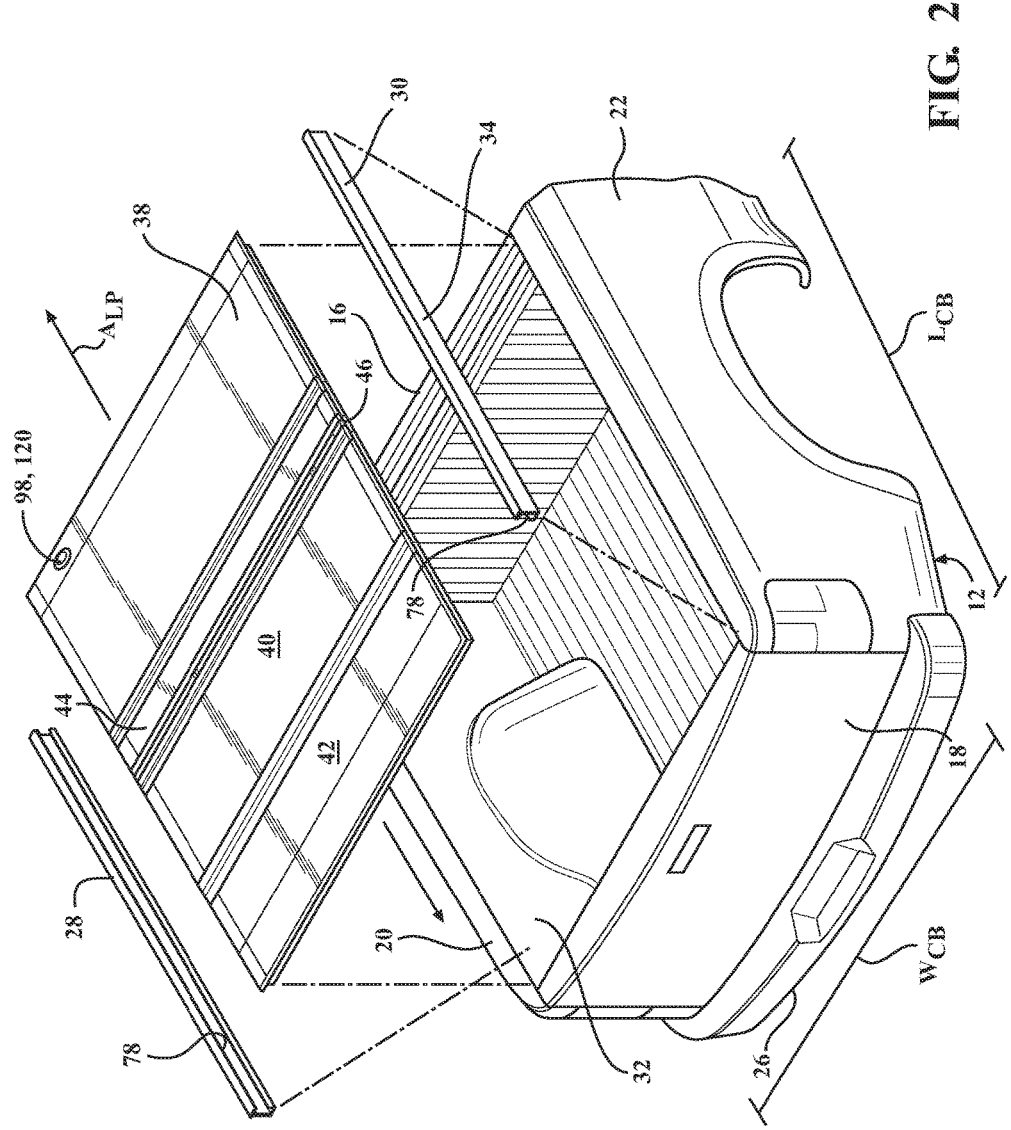
FIG. 2 is a semi-schematic exploded view of the tonneau cover system disposed over and covering the cargo bed of the vehicle.
Figure 3:
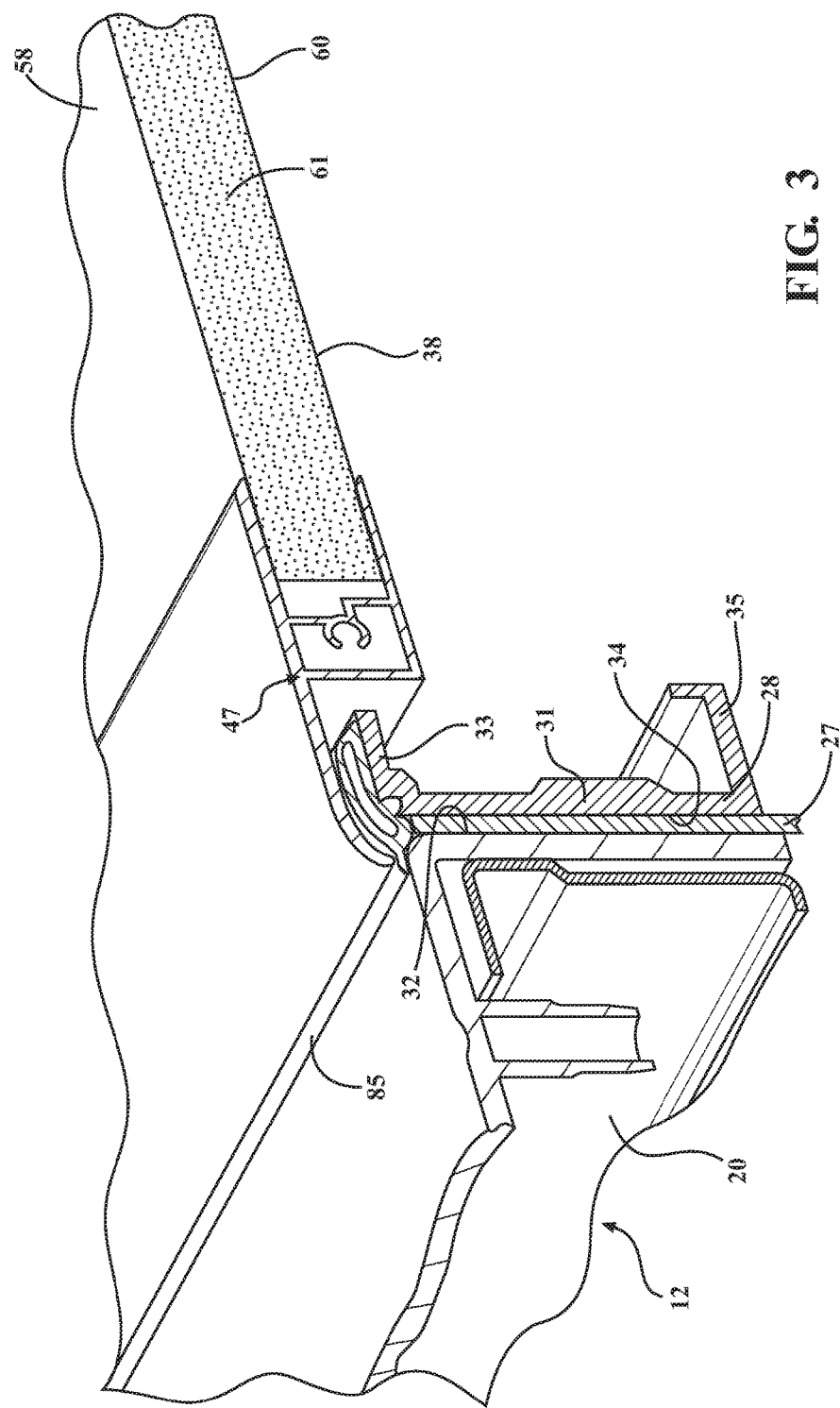
FIG. 3 is a perspective cross-sectional view of a portion of the cargo bed and a portion of the tonneau cover system mounted to the cargo bed.
Figure 4:
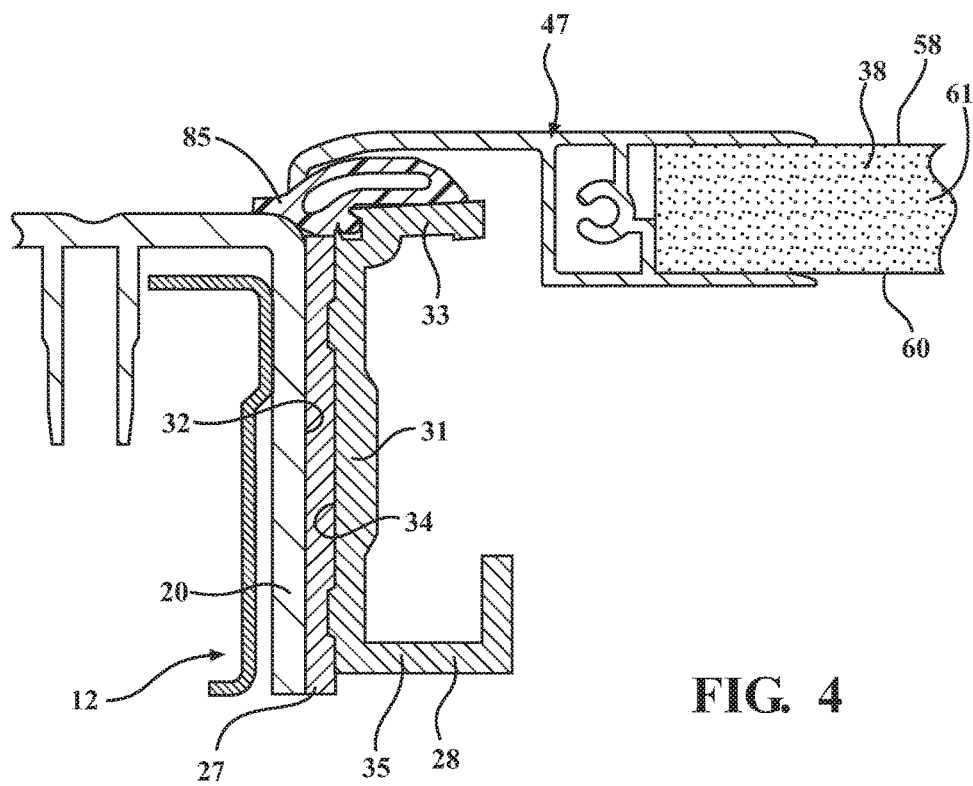
FIG. 4 is a semi-schematic cross-sectional view of a portion of the cargo bed and a portion of the tonneau cover system mounted to the cargo bed.
Figure 5:
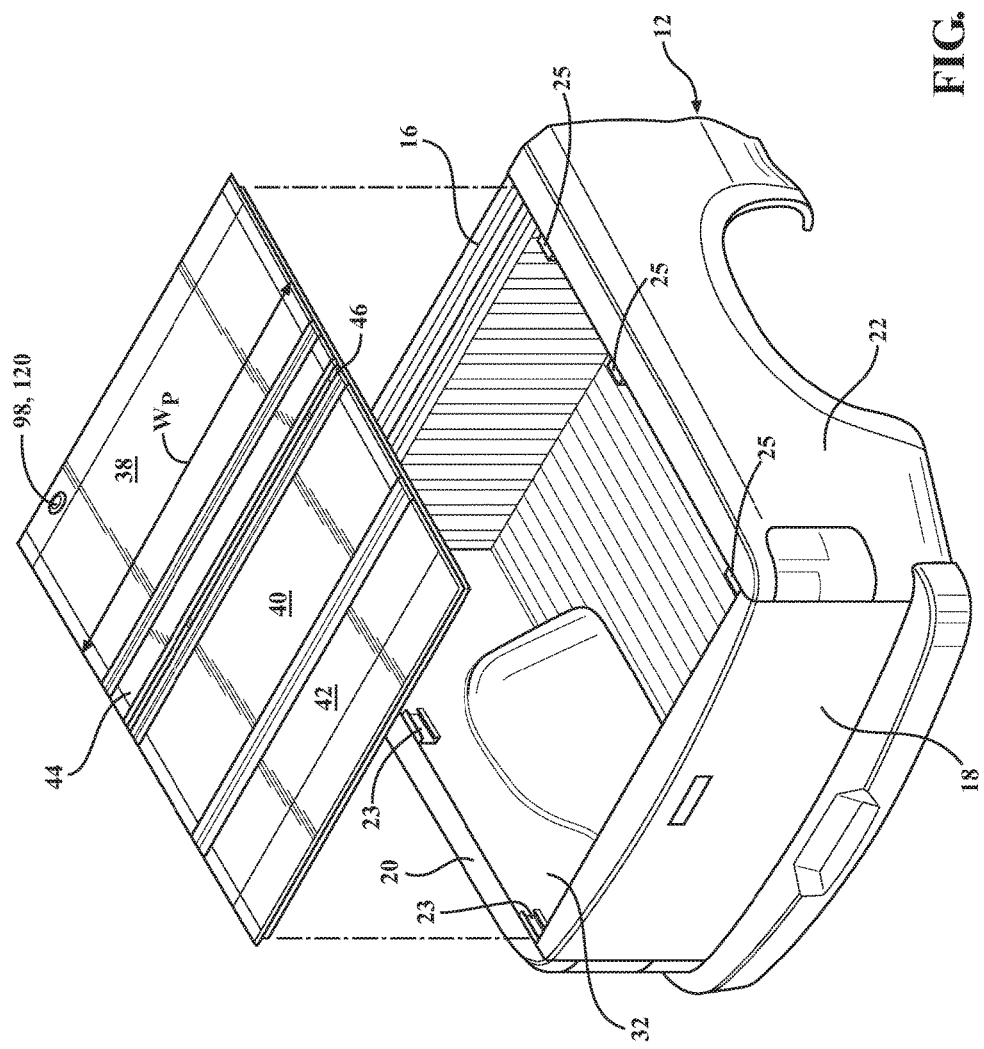
FIG. 5 is a semi-schematic exploded view of another embodiment of the tonneau cover system disposed over and covering the cargo bed of the vehicle.

In one embodiment, and as shown in FIGS. 2-4, the tonneau cover system 10 includes first 28 and second 30 side rails each adapted to be mounted to the vehicle 14. As shown in FIG. 2, the first side rail 28 is parallel with and mounted to one of the sides 20 of the cargo bed 12, and the second side rail 30 is parallel with and mounted to the other side 22 of the cargo bed 12. The side rails 28, 30 extend at least partially along the respective side 20, 22 of the cargo bed 12, and extend along at least a portion of the length $L_{CB}$ of the cargo bed 12. In the embodiment shown in FIG. 2, the side rails 28, 30 extend along the entire length $L_{CB}$ of the cargo bed 12. In an alternative embodiment, and as shown in FIG. 5, the side rails 28, 30 are discontinuous, with each side rail 28, 30 having a plurality of strikers 23, 25 distributed at preselected locations along the sides 20, 22 of the cargo bed 12.

Figure 3A:
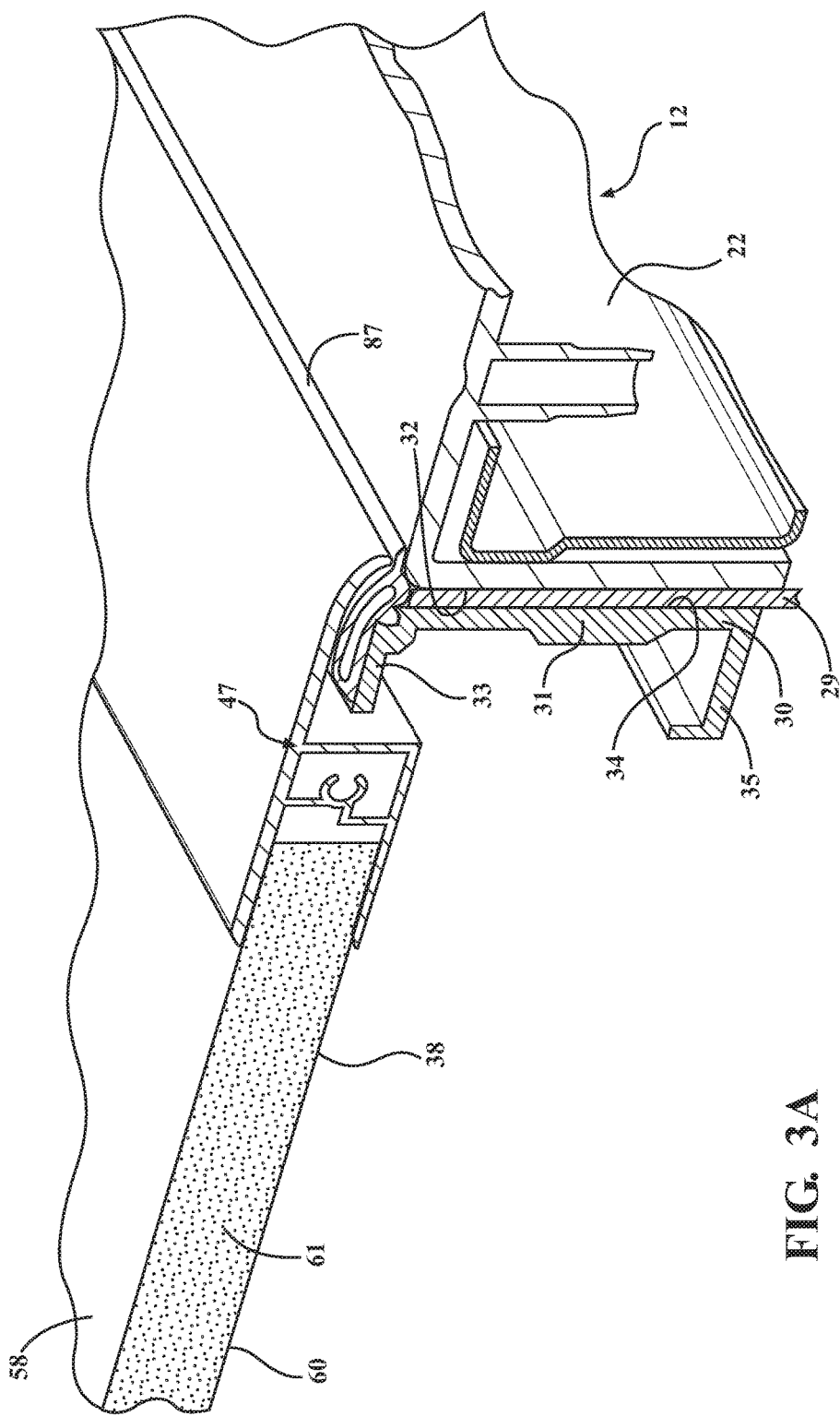
FIG. 3A is a perspective cross-sectional view of another portion of the cargo bed and another portion of the tonneau cover system mounted to the cargo bed.

In the embodiment shown in FIGS. 3 and 4, the side rail 28 is mounted to the side 20 of the cargo bed 12 with a seal 27 disposed between the side rail 28 and the side 20. As shown in FIG. 3A, the side rail 30 is mounted to the other side 22 of the cargo bed 12 with another seal 29 disposed between the side rail 30 and the side 22. In an example, each of the opposing sides 20, 22 has an interior surface 32, and each of the side rails 28, 30 has an exterior surface 34. The opposing sides 20, 22 and the side rails 28, 30 are semi-schematically shown in the figures. Alternatively, the side rails 28, 30 could directly abut the sides 20, 22 of the cargo bed 12. In this alternative embodiment, the configuration of the exterior surface 34 of the side rails 28, 30 could be complementary to a portion of the interior surface 32 of the respective sides 20, 22 of the cargo bed 12. With this configuration, the first side rail 28 fits against and/or within the complementary portion of the interior surface 32 of the one side 20, and the second side rail 30 fits against and/or within the complementary portion of the interior surface 32 of the other side 22. The side rails 28, 30 may be mounted to the respective sides 20, 22 of the cargo bed 12 utilizing any suitable fastening mechanism, such as with one or more fasteners, clamps, latches, and/or the like.

Figure 17:
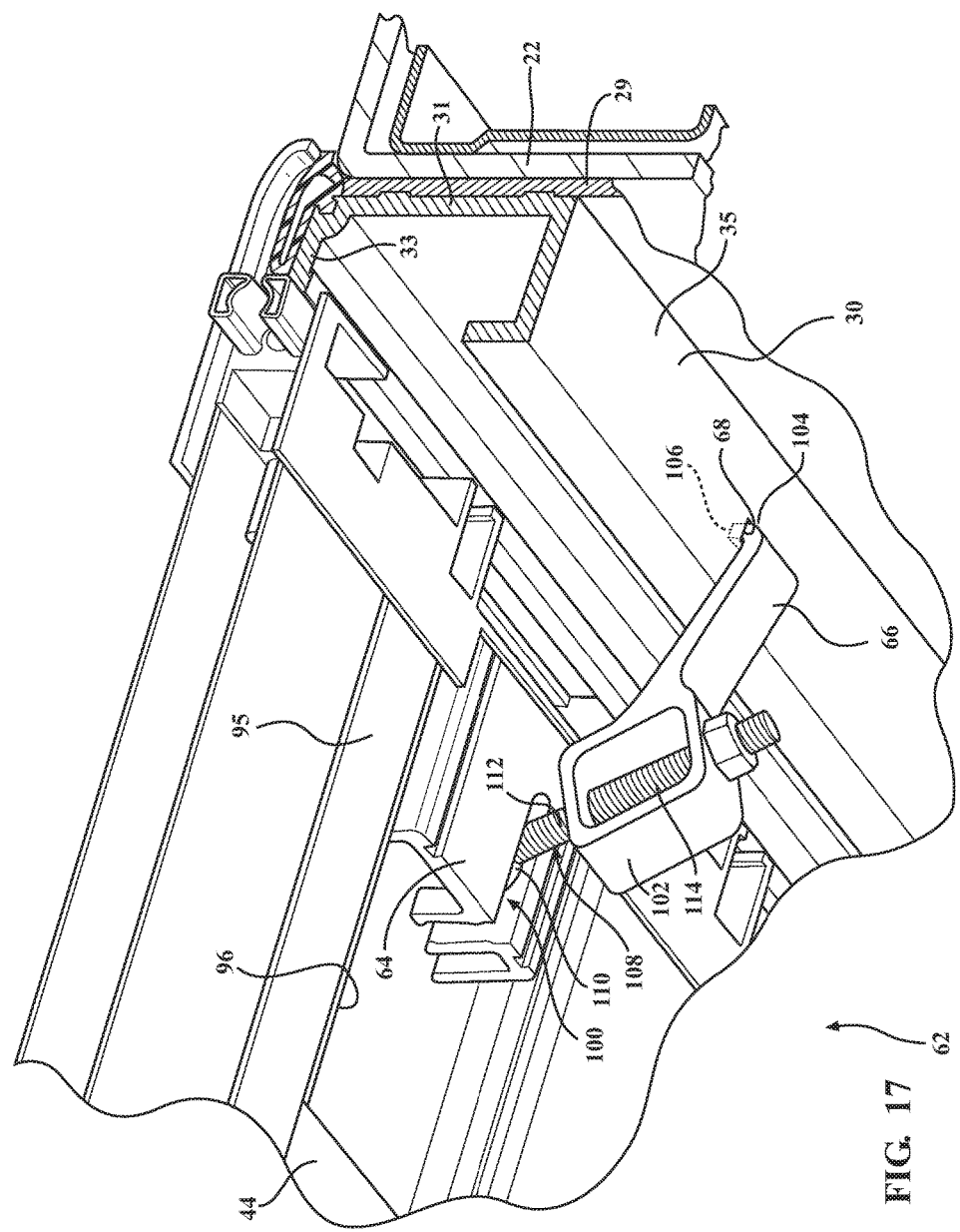
FIG. 17 is a perspective view of a portion of the tonneau cover system including a portion of the fourth panel, a portion of the side rail, and a mounting mechanism for mounting the fourth panel to the side rail.
Figure 18:
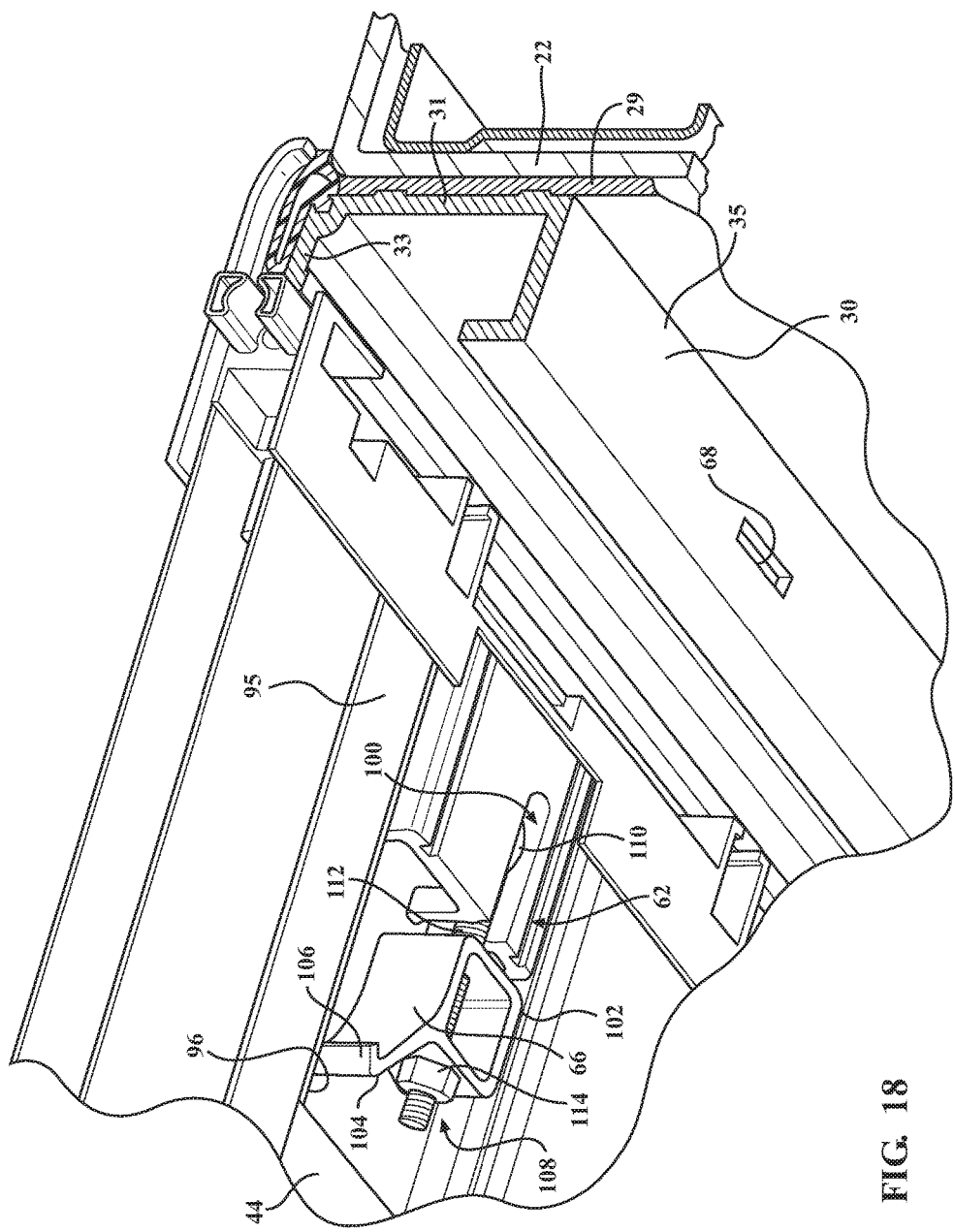
FIG. 18 is a perspective view of a portion of the tonneau cover system including a portion of the fourth panel, a portion of the side rail, and the mounting mechanism for mounting the fourth panel to the side rail.

In the embodiment shown in FIG. 3A, the side rail 30 has a body 31 and opposing, substantially parallel legs 33, 35 extending from the body 31 to define a substantially C-shaped configuration. As shown in FIG. 3, the side rail 28 also has a body 31 and opposing, substantially parallel legs 33, 35 extending from the body 31 to define a substantially C-shaped configuration. In instances where the side rails 28, 30 have a plurality of strikers 23, 25, such as shown in FIG. 5, each striker 23, 25 also defines the substantially C-shaped configuration. As shown in FIGS. 17 and 18, and in one embodiment, the leg 35 of the second side rail 30 defines a slot 68 for receiving a bracket 66 of a mounting mechanism 62 for fixing a fourth panel or spacer bar 44 to the side rail 30. Likewise, the first side rail 28 also defines a slot for receiving another bracket of another mounting mechanism for fixing the fourth panel or spacer bar 44 to the side rail 28. Further details of the mounting mechanism 62 are set forth below.

In addition, and as shown in FIGS. 2-4, the leg 33 of the first side rail 28 (or striker 23, 25) defines a receiving feature for receiving a catch 80 of latch mechanisms 82, 83 adjacent the first side rail 28, and the leg 33 of the second side rail 30 defines a receiving feature for receiving a catch 80 of the latch mechanisms 82, 83 adjacent the second side rail 30. The latch mechanisms 82 are coupled to a first panel 38 of the plurality of panels of the tonneau cover system 10, and the latch mechanisms 83 are coupled to a third panel 42 of the plurality of panels of the tonneau cover system 10. Details of the latch mechanism 82, 83 are also set forth below at least with reference to FIGS. 19 and 20. It is to be understood that the side rail 28 has the same configuration as the side rail 30 described above.

In an alternative embodiment, the first 28 and second 30 side rails may have the body 31 and a single leg 33 to define a substantially L-shaped configuration. In instances where the side rails 28, 30 have a plurality of strikers 23, 25, each striker 23, 25 also defines the substantially L-shaped configuration. In this alternative configuration, the leg 33 of the side rails 28, 30 could operate as the receiving feature for receiving the catch 80 of the respective latch mechanisms 82, 83.

While the side rails 28, 30 (or strikers 23, 25) have been described above as having a substantially C-shaped or L-shaped configuration, it is to be appreciated that the side rails 28, 30 (or strikers 23, 25) can alternatively have any suitable configuration that defines the receiving feature 33.

The tonneau cover system 10 further comprises a plurality of panels coupled to the side rails 28, 30 and defining a longitudinal axis $A_{LP}$ adapted to be along the length $L_V$ of the vehicle 14. It is to be appreciated that the longitudinal axis $A_{LP}$ is the same as the longitudinal axis $A_{LV}$ defined by the vehicle 14. In an embodiment, and as shown at least in FIGS. 2 and 5-16, the plurality of panels includes a first panel 38, a second panel 40 spaced from the first panel 38, a third panel 42 adjacent the second panel 40, and the fourth panel 44 disposed between the first 38 and second 40 panels with the fourth panel 44 fixed to the first 28 and second 30 side rails. The plurality of panels further includes a fifth panel 46, which is part of a hinge assembly 48. The hinge assembly 48 is described in further detail below.

In an alternative embodiment, the tonneau cover system 10 does not include or utilize side rails. In this embodiment, and as shown in FIG. 5 for example, the plurality of panels 38, 40, 42, 44, 46 is directly coupled to the opposing sides 20, 22 of the cargo bed 12. For example, each of the opposing sides 20, 22 may have or define a bed rail, and the plurality of panels 38, 40, 42, 44, 46 is directly coupled to the bed rails. The bed rails also define a suitable receiving feature for receiving the catch 80 of the latch mechanism 82, 83 coupled to the plurality of panels of the tonneau cover system 10.

As previously mentioned, the plurality of panels includes the first 38, second 40, third 42, fourth 44, and fifth 46 panels. Although the configuration of just the first panel 38 is shown in FIGS. 3 and 4, the second 40, third 42, fourth 44, and fifth 46 panels have substantially the same configuration. In an example, each of the panels 38, 40, 42, 44, 46 is formed of a rigid material. The rigid material may be selected from any material exhibiting a suitable degree of resistance to deformation in response to an applied force or load. Typically, the panels 38, 40, 42, 44, 46 are formed of a lightweight rigid material. Non-limiting examples of suitable rigid materials include metals (such as aluminum, aluminum alloys, steels, and/or the like), polymers such as a thermoplastic olefin, fiber-reinforced plastics, composites, laminates, and/or combinations thereof. As shown in FIGS. 3-4, 10, 12, and 14, the panel 38 has opposing top 58 and bottom 60 sheets or surfaces formed of the rigid material, and a polymeric core 61 disposed between the top 58 and bottom 60 surfaces. As shown in FIGS. 10, 12, and 14, each of the remaining panels 40, 42, 44, 46 also has opposing top 58 and bottom 60 sheets or surfaces formed of the rigid material, and a polymeric core 61 disposed between the top 58 and bottom 60 surfaces. The polymeric core 61 can be a polymeric foam, such as a polystyrene foam or other suitable foamed resin. The polymeric core 61 can otherwise have a honeycomb configuration. While polymeric cores are typical, the core could alternatively be formed of or include a metal (such as aluminum, an aluminum alloy, a steel, and/or the like). In another embodiment, each of the panels 38, 40, 42, 44, 46 could be solid panels formed of the rigid material.

As illustrated in FIGS. 8-10 and 12, each of the panels 38, 40, 42, 44, 46 has a substantially rectangular configuration, and each has opposing first 50 and second 52 ends and opposing first 54 and second 56 sides. It is to be understood that the rectangular configuration is dependent, at least in part, on the dimensions of the cargo bed 12 of the vehicle 14. Each of the panels 38, 40, 42, 44, 46 also has a length $L_P$ defined between the opposing ends 50, 52 along the longitudinal axis $A_{LP}$, and has a width $W_P$ defined between opposing sides 54, 56. In addition, one side 54 of each of the panels 38, 40, 42, 44, 46 is adjacent and substantially parallel to the first side rail 28, and the other side 56 of each of the panels 38, 40, 42, 44, 46 is adjacent and substantially parallel to the second side rail 30. In an embodiment, the length $L_P$ of the fourth panel 44 is smaller than the length $L_P$ of each of the first 38, second 40, and third 42 panels. In another embodiment, the length $L_P$ of the fourth panel 44 is smaller than the length $L_P$ of each of the first 38, second 40, and third 42 panels, and the length $L_P$ of the fourth panel 44 is larger than the length $L_P$ of the fifth panel 46.

Each of the first 38, second 40, third 42, fourth 44, and fifth 46 panels has a perimeter or periphery 45, and each of the panels 38, 40, 42, 44, 46 has a frame 47 disposed about at least a portion of the perimeter 45. In an embodiment, the frame 47 includes a plurality of outer frame members, including a first outer frame member 84 adjacent and substantially parallel to the first side rail 28 and a second outer frame member 86 adjacent and substantially parallel to the second side rail 30. The first 84 and second 86 outer frame members extend along the longitudinal axis $A_{LV}$, and the first 84 and second 86 outer frame members are substantially parallel to one another. The frame 47 further includes a third outer frame member 88 adjacent and substantially parallel to the first end 50 of each of the panels 38, 40, 42, 44, 46, and a fourth outer frame member 90 adjacent and substantially parallel to the second end 52 of the each of the panels 38, 40, 42, 44, 46. The third 88 and fourth 90 outer frame members extend along the width-wise axis $A_W$ between the first 84 and second 86 outer frame members. In addition, the third 88 and fourth 90 outer frame members are substantially parallel to one another.

It is to be appreciated that the outer frame members 84, 86, 88, 90 are typically discontinuous. In other words, neither the first 84 and second 86 outer frame members directly touch the third 88 and fourth 90 outer frame members. Additionally, the outer frame members 84, 86, 88, 90 of adjacent panels 38, 40, 42, 44, 46 do not directly touch one another. The discontinuity of the outer frame members 84, 86, 88, 90 enables the panels 38, 40, 42, 44, 46 to pivot relative to one another when opening one or more of the first 38, second 40, and third 42 panels for access to the interior of the cargo bed 12.

At least as shown in FIGS. 7, 8, and 18-21, the frame 47 includes a first inner frame member 92 coupled to the first panel 38 and extending along the width-wise axis $A_W$ between the first 84 and second 86 outer frame members. The frame 47 further includes a second inner frame member 94 coupled to the third panel 42 and extending along the width-wise axis $A_W$ between the first 84 and second 86 outer frame members. The first inner frame member 92 defines a channel 96 for receiving and supporting the latch mechanism(s) 82 and a forward release device 98 for actuating the latch mechanism(s) 82 to unlatch the first panel 38 from the side rails 28, 30. The second inner frame member 94 defines a channel 97 for receiving and supporting the latch mechanisms 83 and a rearward release device 99 for actuating the latch mechanism 83 to unlatch the third panel 42 from the side rails 28, 30. In instances where the tonneau cover system 10 is mounted directly to the cargo bed 12, the first inner frame member 92 defines the channel 96 for receiving and supporting the latch mechanism(s) 82 and the forward release device 98 for actuating the latch mechanism(s) 82 to unlatch the first panel 38 from the sides 20, 22 of the cargo bed 12 adjacent the header 16. The second inner frame member 94 defines the channel 97 for receiving and supporting the latch mechanisms 83 and the rearward release device 99 for actuating the latch mechanisms 83 to unlatch the third panel 42 from the sides 20, 22 of the cargo bed 12 adjacent the tailgate 18.

In an embodiment, the frame 47 further includes a third inner frame member 95 coupled to the fourth panel 44 and extending along the width-wise axis $A_W$ between the first 84 and second 86 outer frame members, see FIGS. 17 and 18. The third inner frame member 95 also defines a channel 96 for receiving and supporting the mounting mechanism 62 for fixing the fourth panel 44 to the first 28 and second 30 side rails.

In addition, and as shown in FIGS. 3 and 4, the tonneau cover system 10 includes a first seal 85 extending along the longitudinal axis $A_{CB}$ and disposed between the first side rail 28 and the side 20 of the cargo bed 12. As shown in FIG. 3A, the tonneau cover system 10 further includes a second seal 87 extending along the longitudinal axis $A_{CB}$ and disposed between the second side rail 30 and the side 22 of the cargo bed 12. In one embodiment, the first seal 85 is coupled to the first side rail 28 and abuts the side 20 of the cargo bed 12, and the second seal 87 is coupled to the second side rail 30 and abuts the side 22 of the cargo bed 12. In this embodiment, the seals 85, 87 form a seal at an interface between the frame 47 of the tonneau cover system 10 and the respective side rails 28, 30. The first seal 85 coupled to the tonneau cover system 10 also abuts the side 20 of the cargo bed 12, and the second seal 87 coupled to the tonneau cover system 10 also abuts the side 22 of the cargo bed 12. In this embodiment, the seals 85, 87 also form a seal at an interface between the frame 47 of the tonneau cover system 10 and the respective sides 20, 22 of the cargo bed 12.

Referring now to FIGS. 6-16, the plurality of panels is arranged such that the first panel 38 is positioned adjacent the header 16 of the cargo bed 12, the fourth panel 44 is positioned adjacent the first panel 38, the hinge assembly 48 including the fifth panel 46 is positioned adjacent the fourth panel 44, the second panel 40 is positioned adjacent the hinge assembly 48, and the third panel 42 is positioned adjacent the second panel 40. The third panel 42 is also positioned adjacent the tailgate 18 of the cargo bed 12.

The first panel 38 of the plurality of panels is pivotally coupled to the fourth panel 44 to enable the first panel 38 to pivot relative to the fourth panel 44. In an embodiment, the tonneau cover system 10 includes a second hinge 72 mounted to the first 38 and fourth 44 panels to enable the first panel 38 to pivot relative to the fourth panel 44. The second hinge 72 enables the first panel 38 to pivot between a closed position (as shown in FIGS. 9 and 10) and an opened position (as shown in FIGS. 11 and 12). In instances where the tonneau cover system 10 includes the side rails 28, 30, the second end 52 of the first panel 38 is adjacent the side rails 28, 30 when in the closed position (as shown in FIG. 9). In instances where the tonneau cover system 10 does not include side rails 28, 30 and the panels are mounted directly to the cargo bed 12, the first panel 38 could engage the sides 20, 22 of the cargo bed 12 adjacent the header 16 or a discontinuous side rail (or striker 23, 25) when in the closed position. When in the opened position or partially opened position (which is any position between the closed position and the fully opened position), the second end 52 of the first panel 38 is spaced from the side rails 28, 30 (as shown in FIG. 11). Also when in the opened or partially opened position, the first panel 38 provides partial access to the cargo bed 12 proximate the header 16.

The third panel 42 is pivotally coupled to the second panel 40 to enable the third panel 42 to pivot relative to the second panel 40 and to permit the third panel 42 to be located over the second panel 40. In an embodiment, the tonneau cover system 10 further includes a first hinge 70 mounted to the second 40 and third 42 panels to enable the third panel 42 to pivot relative to the second panel 40. As shown, the first hinge 70 is mounted to the second end 52 of the third panel 42. The first hinge 70 enables the third panel 42 to pivot between a closed position (as shown in FIGS. 9 and 10) and an opened position (as shown in FIGS. 13 and 14). When in the closed position, the first end 50 of the third panel 42 is adjacent the side rails 28, 30 (as shown in FIG. 9). When in the opened position or partially opened position (which is any position between the closed position and the fully opened position), the first end 50 of the third panel 42 is spaced from the side rails 28, 30 (as shown in FIG. 13).

As shown in FIG. 13, the third panel 42 is in a fully opened position when the third panel 42 is located over the second panel 40 and into an intermediate folded position of the tonneau cover system 10. In this fully opened position, or even in a partially opened position, the third panel 42 provides partial access to the cargo bed 12 proximate the tailgate 18. In addition, the second 40 and third 42 panels provide partial access to the cargo bed 12 when in the intermediate folded position.

The second panel 40 is pivotally coupled to the fourth panel 44 so that the second 40 and third 42 panels pivot relative to the fourth panel 44 as a unit from the intermediate folded position to a final folded position of the tonneau cover system 10. As shown in FIGS. 15 and 16, the second 40 and third 42 panels, as a unit, are located over the fourth panel 44 and a portion of the first panel 38 when in the final folded position. Accordingly, the first panel 38 remains in the closed position when the second 40 and third 42 panels are in the final folded position. In addition, the first 38, second 40, third 42, and fourth 44 panels are parallel to each other when the second 40 and third 42 panels are in the final folded position. Partial access to the cargo bed 12, adjacent the tailgate 18, is typically achieved when the second 40 and third 42 panels, as a unit, are in the final folded position. Said differently, the second 40 and third 42 panels provide partial access to the cargo bed 12 when in the final folded position.

As shown in FIGS. 11, 13, and 15, the first panel 38 is pivotable relative to the fourth panel 44 in a first direction and the third panel 42 is pivotable relative to the fourth panel 44 in a second direction. In the illustrated embodiment, the second direction is opposite the first direction. For example, the first panel 38 pivots relative to the fourth panel 44 in a direction towards the tailgate 18, and the third panel 42 pivots relative to the second panel 40 in a direction towards the header 16. In addition, the first panel 38 is pivotable relative to the fourth panel 44 in the first direction, and the second 40 and third 42 panels are pivotable relative to the fourth panel 44 in the second direction, where the first direction is opposite the second direction. In this example, the first panel 38 pivots relative to the fourth panel 44 in a direction towards the tailgate 18, and the second 40 and third 42 panels, as a unit, pivot relative to the fourth panel 44 in a direction towards the header 16.

As previously mentioned, the fourth panel 44 is fixed to the first 28 and second 30 side rails, and remains fixed to the side rails 28, 30 when the first 38, second 40, and third 42 panels pivot to provide access to the interior of the cargo bed 12. In instances where the panels are mounted directly to the cargo bed 12, the fourth panel 44 is fixed to the sides 20, 22, and remains fixed to the sides 20, 22 of the cargo bed 12 when the first 38, second 40, and third 42 panels pivot to provide access to the interior of the cargo bed 12. In certain embodiments, the fourth panel 44 may be referred to as a spacer bar which is fixed to the side rails 28, 30, or fixed to the sides 20, 22 of the cargo bed 12. The spacer bar is also formed of a rigid material having the top 58 and bottom 60 surfaces to define a panel configuration.

Figure 8:
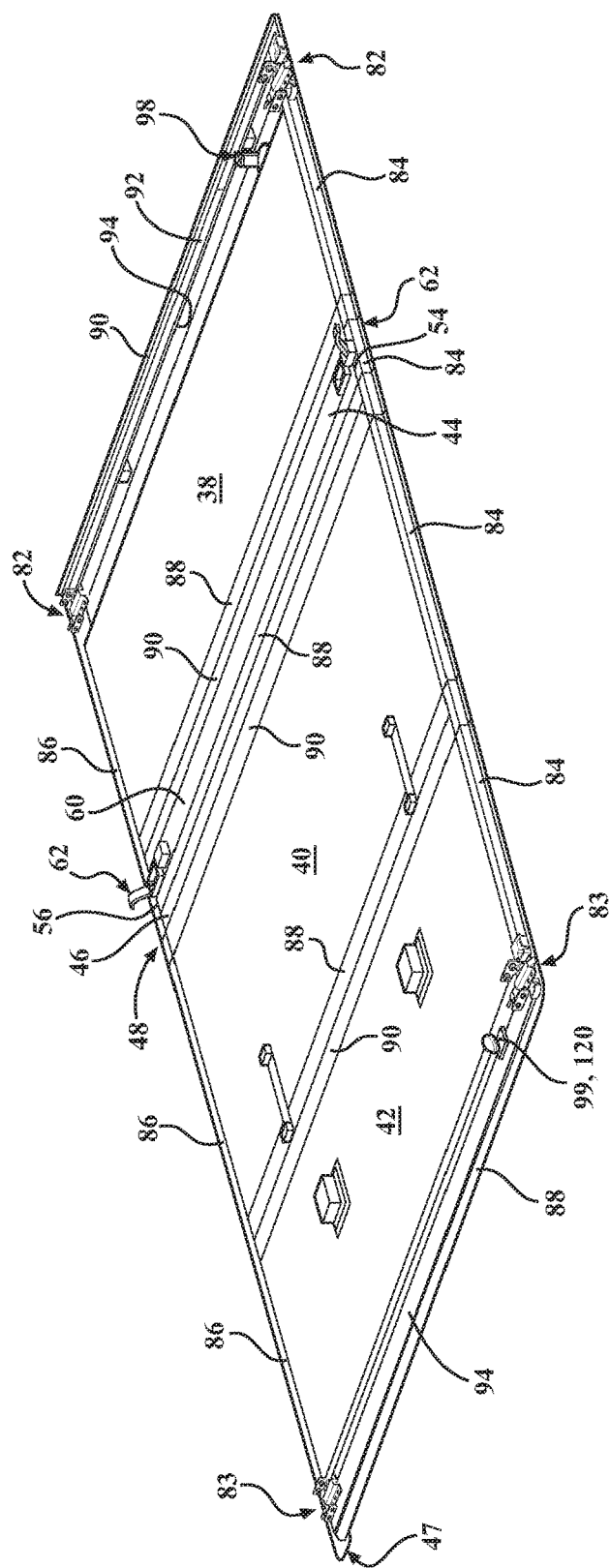
FIG. 8 is another bottom perspective view of the plurality of panels, the plurality of hinges, the hinge assembly, and frame of the tonneau cover system of FIG. 7, with a portion of the inner frame members removed to expose a channel with first and second latch mechanisms at least partially disposed in the channel.

As shown in FIGS. 8, 17, and 18, the tonneau cover system 10 includes the mounting mechanism 62 located at each of the first 54 and second 56 sides of the fourth panel 44. The mounting mechanism 62 at the first side 54 of the fourth panel 44 fixes the first side 54 to the first side rail 28, and the mounting mechanism 62 at the second side 54 of the fourth panel 44 fixes the second side 56 to the second side rail 30.

In an embodiment, the mounting mechanism 62 is disposed within and secured to the channel 96 defined in the third inner frame member 95. The mounting mechanism 62 includes a housing 64 defining an opening 100, and is coupled to the bottom surface 60 of the fourth panel 44. More particularly, the housing 64 is disposed within the channel 96 and mounted to the third inner frame member 95.

The mounting mechanism 62 further includes a bracket 66 coupled to the housing 64 and moveable between stowed and locked positions. In an embodiment, the bracket 66 is formed of a metal or another suitably strong material. As shown in FIGS. 17 and 18, the bracket 66 has opposing ends 102, 104, with one end 102 coupled to the housing 64 and the other end 104 having a lip 106 that is insertable into the slot 68 defined in the leg 35 of the side rail 28, 30. In another embodiment, the lip 106 of the end 104 engages the side 20, 22 of the cargo bed 12 directly. The end 102 of the bracket 66 is coupled to the housing 64 with a fastener 108. In the embodiment shown, the end 102 of the bracket 66 defines an aperture (not shown), and the fastener 108 is disposed through the aperture and secured to the end 102. The fastener 108 is also disposed within the opening 100 defined in the housing 64 such that the fastener 108 can move and/or pivot within the opening 100. In this way, the bracket 66 can be moved between the locked and stowed positions.

In an example, the fastener 108 may include a head 110 and a threaded body 112 extending from the head. The threaded body 112 may be inserted into the opening 100 defined in the housing 64 with the head 110 abutting an underside of the housing 64. The threaded body 112 is disposed through the aperture defined in the bracket 66. The bracket 66 can be moved into the locked position by pivoting the fastener 108 to position the bracket 66 such that the lip 106 is aligned with the slot 68 defined in the side rail 28, 30. The lip 106 is inserted into the slot 68, and the fastener 108 is tightened within the opening 100 utilizing a suitable tightening mechanism 114, such as one or more nuts, etc. to secure the fastener 108 and the bracket 66 in the desired position. Once the bracket 66 is secured in the locked position, the side 54, 56 of the fourth panel 44 is secured to the side rail 28, 30. When fixed to the side rail 28, 30, the fourth panel 44 is unable to move during the pivoting motion of the first 38, second 40, and third 42 panels.

The fourth panel 22 can be released from the side rails 28, 30 by manually moving the bracket 66 into the stowed position. For example, and with reference to FIG. 18, the bracket 66 can be moved into the stowed position by loosening the tightening mechanism 114 to release the lip 106 from the slot 38 defined in the side rail 28, 30, and then pivoting the fastener 108 to move the bracket 66 away from the side rail 28, 30 to a position against the channel 96 defined by the third inner frame member 95. The tightening mechanism 114 may be re-tightened to secure the bracket 66 in the stowed position.

Figure 6:
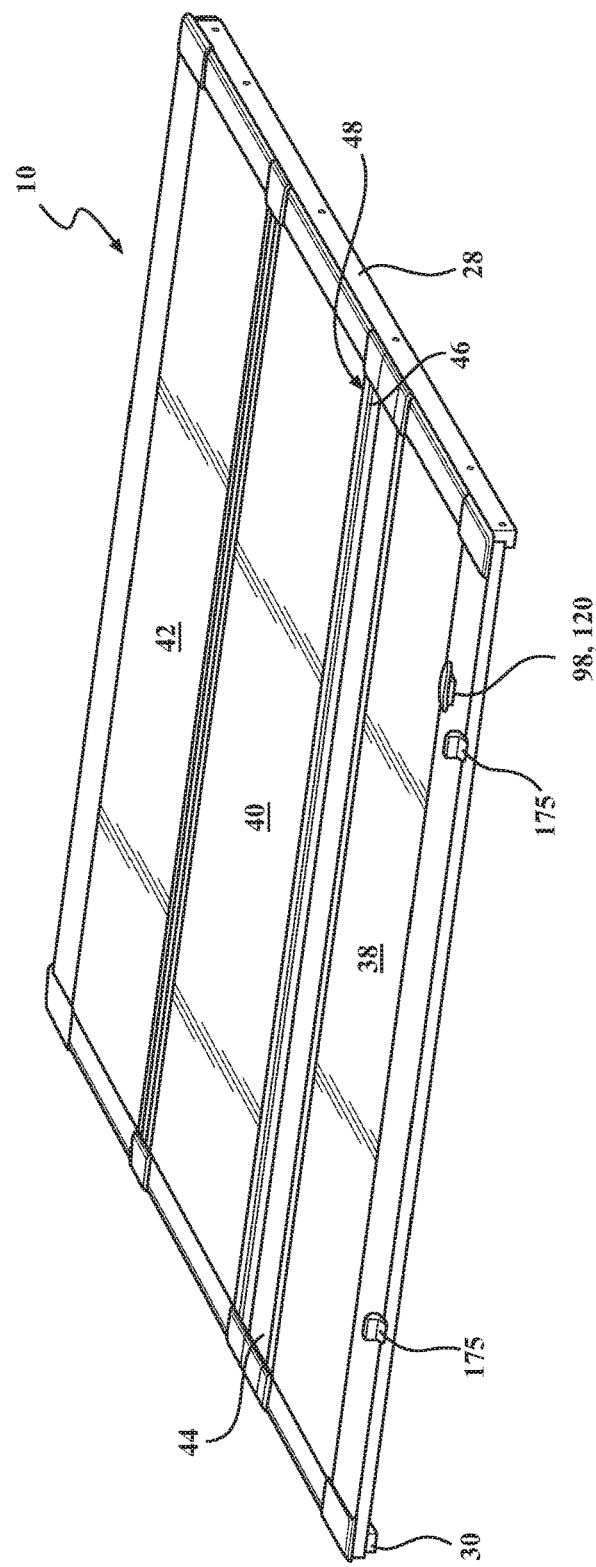
FIG. 6 is a top perspective view of the tonneau cover system.

With the fourth panel 44 fixed to the side rails 28, 30, the first panel 38 pivots relative to the fourth panel 44 while the fourth panel 44 remains fixed to the side rails 28, 30. The third panel 42 pivots relative to the second panel 40 to permit the third panel 42 to be located over the second panel 40 while the fourth panel 44 remains fixed to the side rails 28, 30 to define the intermediate folded position of the tonneau cover system 10. In addition, the second 40 and third 42 panels pivot relative to the fourth panel 44, as a unit, from the intermediate folded position to the final folded position located over the fourth panel 44 and a portion of the first panel 38 while the fourth panel 44 remains fixed to the side rails 28, 30. In an embodiment, and as shown in FIG. 6, the tonneau cover system 10 includes buckles 175 and the plurality of panels includes straps (not shown). The straps are tied or otherwise attached to the buckles 175 to secure the panels in the final folded position. This is desirable, for example, when the vehicle 14 is being operated while the tonneau cover system 10 is in the final folded position.

As previously mentioned, and with reference to FIGS. 9-16, the tonneau cover assembly 10 further includes the hinge assembly 48. The hinge assembly 48 has the fifth panel 46, a third hinge 74, and a fourth hinge 76. The third hinge 74 is mounted to the fourth 44 and fifth 46 panels and the fourth hinge 76 is mounted to the second 40 and fifth 46 panels such that the hinge assembly 48 is mounted between the second 40 and fourth 44 panels. The hinge assembly 48 operates as a unit and enables the second 40 and third 42 panels to pivot relative to the fourth panel 44, as a unit, from the intermediate folded position to the final folded position of the tonneau cover assembly 10. When the second 40 and third 42 panels pivot relative to the fourth panel 44 and into the final folded position (again, where the second 40 and third 42 panels are located over the fourth panel 44 and a portion of the first panel 38), the hinge assembly 48 is positioned such that the fifth panel 46 is transverse to the fourth panel 44. This is shown in FIGS. 15 and 16. However, the fifth panel 46 is parallel to the fourth panel 44 when the second 40 and third 42 panels are in the intermediate folded position (again, where the third panel 42 is located over the second panel 40). Details of the first 70, second 72, third 74, and fourth 76 hinges are described below.

As previously mentioned, the first panel 38 further includes at least one latch mechanism 82 for latching the first panel 38 to at least one of the first 28 and second 30 side rails. In one embodiment, the first panel 38 has a single latch mechanism 82 for latching the first panel 38 to one of the first 28 and second 30 side rails. In another embodiment, the first panel 38 has two latch mechanisms 82, with one of the latch mechanisms 82 at one side 54 of the first panel 38 for latching the first panel 38 to the first side rail 28, and the other latch mechanism 82 at the other side 56 of the first panel 38 for latching the first panel 38 to the second side rail 28.

Figure 20:
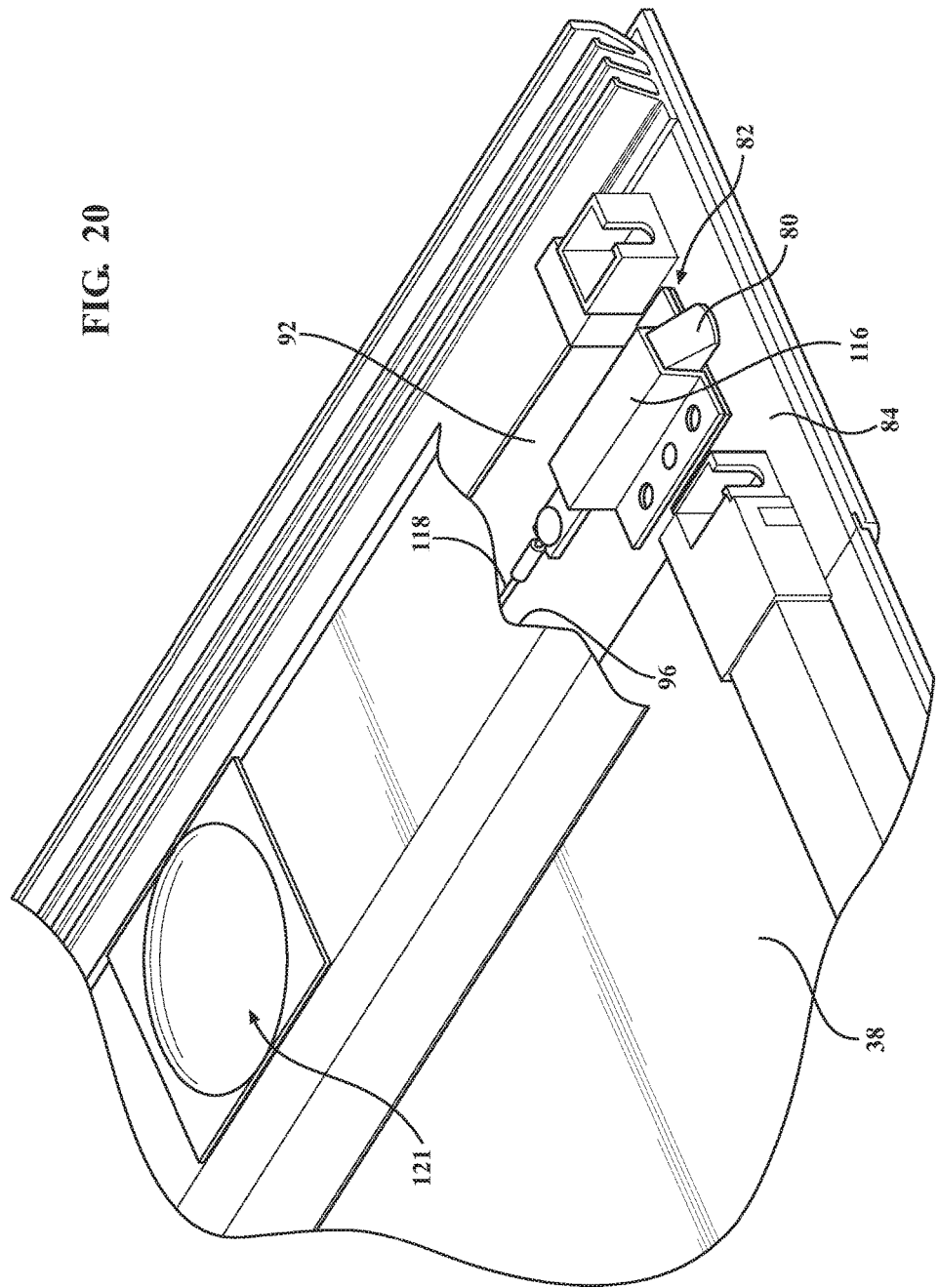
FIG. 20 is a bottom perspective view of a portion of the first panel, a portion of an outer frame member, a portion of an inner frame member, a channel defined in the inner frame member, and a latch mechanism at least partially disposed in the channel.

An embodiment of the latch mechanism 82 coupled to the first panel 38 is shown at least in FIG. 20. The latch mechanism 82 has the catch 80 moveable between latch and unlatch positions. The catch 80 is biased toward the side rail 28, 30 and towards the latch position. In the latch position, the catch 80 is captured within the receiving feature 33 defined in the side rail 28, 30. In an embodiment, the catch 80 is biased toward the latch position by a biasing spring (not shown). The latch mechanism 82 further includes a catch housing 116 mounted to the first inner frame member 92, and the catch 80 is partially disposed and supported in the catch housing 116. When in the latch position, the catch 80 engages the receiving feature 33 defined in the side rail 28, 30 to latch the first panel 38 to the side rail 28, 30.

As shown at least in FIGS. 5, 8, and 9-16, the first panel 38 further has the forward release device 98 coupled to the latch mechanism(s) 82. In an embodiment, the forward release device 98 is coupled to the latch mechanism(s) 82 with at least one cable 118. The forward release device 98 includes a forward handle 120 coupled to the top surface 58 of the first panel 38. A cover 121 is coupled to bottom surface 60 and is used to cover the release device 98 from the bottom side. With this configuration, an operator can access the forward handle 120 from a position above the tonneau cover system 10. The forward release device 98 is actuatable to retract the cable 118 and release the catch 80 of the latch mechanism(s) 82 from the receiving feature 33 to move the catch 80 from the latch position to the unlatch position. Accordingly, when actuated, the forward release device 98 retracts the cable 118 and releases the catch 80 from the receiving feature 33 to unlatch the first panel 38 from the side rail 28, 30.

In instances where the first panel 38 has two latch mechanisms 82, the forward release device 98 may be coupled to one of the latch mechanisms 82 with one cable 118, and may be coupled to the other latch mechanism 82 with another cable 118. The forward release device 98 may be actuated to retract and release the catch 80 of one of the latch mechanisms 82 simultaneously with the catch 80 of the other latch mechanism 82. In this way, the forward release device 98 retracts and releases the respective catches 80 of the two latch mechanisms 82 from the respective receiving features 33 defined in the first 28 and second 30 side rails to unlatch the first panel 38 from the first 28 and second 30 side rails.

Figure 7:
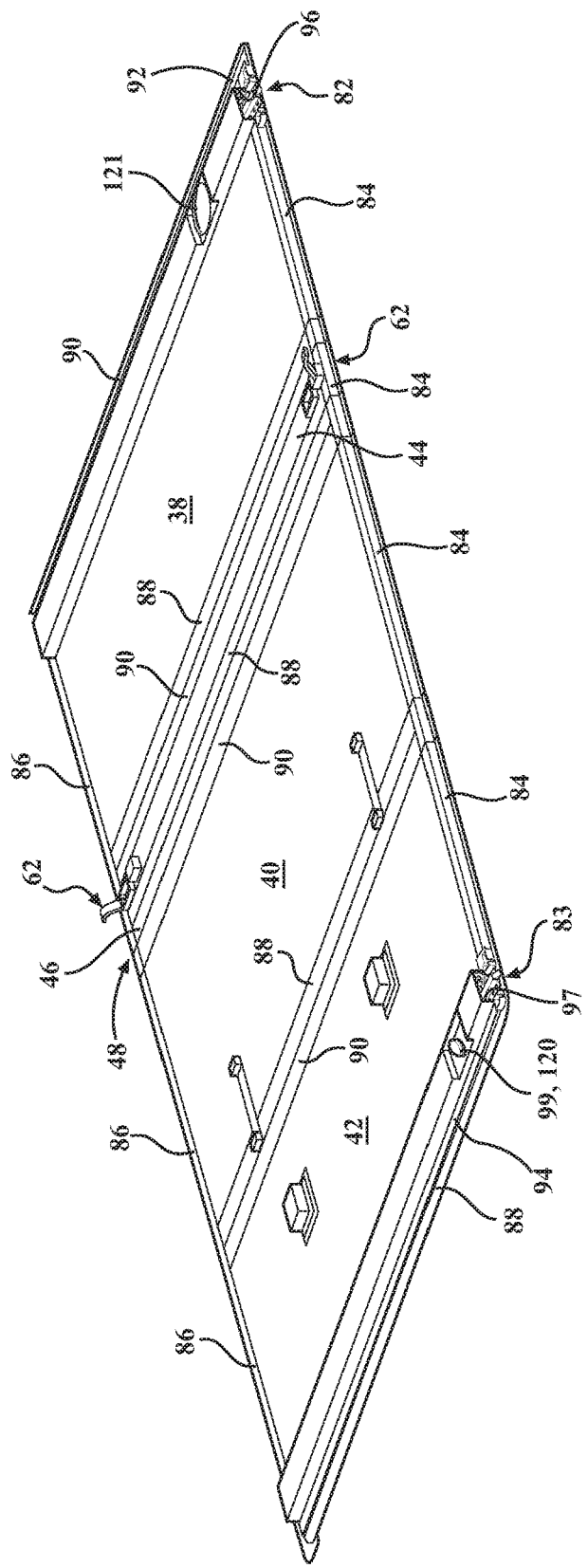
FIG. 7 is a bottom perspective view of the plurality of panels, a plurality of hinges, a hinge assembly, and a frame of the tonneau cover system, with the frame including outer and inner frame members.
Figure 19:
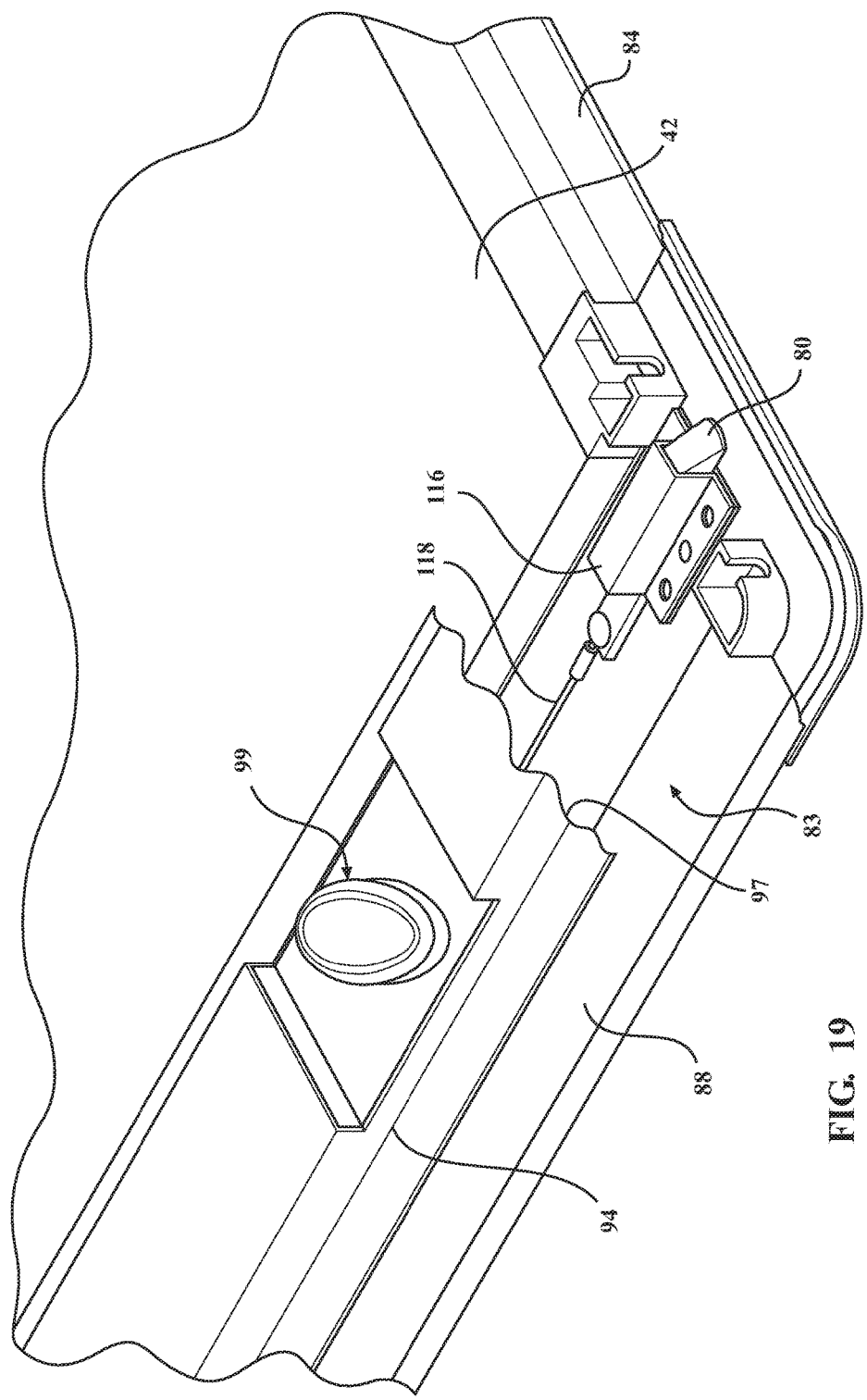
FIG. 19 is a bottom perspective view of a portion of the third panel, a portion an outer frame member, a portion of an inner frame member, a channel defined in the inner frame member, and a latch mechanism at least partially disposed in the channel.

As shown in FIGS. 7, 8, and 19, the third panel 42 also includes at least one latch mechanism 83 for latching the third panel 42 to at least one of the first 28 and second 30 side rails. In one embodiment, the third panel 42 has a single latch mechanism 83 for latching the third panel 42 to one of the first 28 and second 30 side rails. In another embodiment, the third panel 42 has two latch mechanisms 83, with one of the latch mechanisms 83 at one side 54 of the third panel 42 for latching the third panel 42 to the first side rail 28, and the other latch mechanism 83 at the other side 56 of the third panel 42 for latching the third panel 42 to the second side rail 30.

An embodiment of the latch mechanism 83 coupled to the first panel 38 is shown at least in FIG. 19. The latch mechanism 83 has the catch 80 moveable between latch and unlatch positions. The catch 80 is biased toward the side rail 28, 30 and towards the latch position. In the latch position, the catch 80 is captured within the receiving feature 33 defined in the side rail 28, 30. In an embodiment, the catch 80 is biased toward the latch position by a biasing spring. The latch mechanism 82 further includes a catch housing 116 mounted to the first inner frame member 92, and the catch 80 is partially disposed and supported in the catch housing 116. When in the latch position, the catch 80 engages the receiving feature 33 defined in the side rail 28, 30 to latch the first panel 38 to the side rail 28, 30.

As also shown in FIGS. 7, 8, and 19, the third panel 42 further has a rearward release device 99 coupled to the latch mechanism(s) 83. In an embodiment, the rearward release device 99 is coupled to the latch mechanism(s) 83 with at least one cable 118. The rearward release device 98 includes a rearward handle 120 coupled to the bottom surface 60 of the third panel 42. With this configuration, an operator can access the rearward handle 120 from a position below the tonneau cover system 10, such as by opening the tailgate 18 and reaching under the third panel 42. The rearward release device 99 is actuatable to retract and release the catch 80 from the receiving feature 33 to move the catch 80 from the latch position to the unlatch position. Accordingly, when actuated, the rearward release device 99 retracts and releases the catch 80 from the receiving feature 99 to unlatch the third panel 42 form the side rail 28, 30.

In instances where the third panel 42 has two latch mechanisms 83, the rearward release device 99 may be coupled to one of the latch mechanisms 83 with one cable 118, and may be coupled to the other latch mechanism 83 with another cable 118. The rearward release device 99 may be actuated to retract and release the catch 80 of one of the latch mechanisms 83 simultaneously with the catch 80 of the other latch mechanism 83. In this way, the rearward release device 99 retracts and releases the respective catches 80 of the two latch mechanisms 83 from the respective receiving features 33 defined in the first 28 and second 30 side rails to unlatch the third panel 42 from the first 28 and second 30 side rails.

Embodiments of the first 70, second 72, third 73, and fourth 74 hinges are described in detail below at least with reference to FIGS. 21-26. Each hinge 70, 72, 74, 76 is mounted to adjacent panels to enable one of the adjacent panels to pivot relative to another of the adjacent panels. For example, and as previously mentioned, the first hinge 70 is mounted to the second 40 and third 42 panels to enable the third panel 42 to pivot relative to the second panel 40. The second hinge 72 is mounted to the first 38 and fourth 44 panels to enable the first panel 38 to pivot relative to the fourth panel 44. The third 74 and fourth 76 hinges are part of the hinge assembly 48, which is mounted between the second 40 and fourth 44 panels to enable the second 40 and third 42 panels to pivot relative to the fourth panel 44 as a unit. Typically, each of the hinges 70, 72, 74, 76 has a width $W_h$ extending along the width-wise axis $A_W$ of the vehicle 14, and the hinges 70, 72, 74, 76 extend along at least a portion of the width $W_P$ of the panels 38, 40, 42, 44.

For purposes of simplicity, the embodiments of the hinge will be described with reference to the first hinge 70, which is mounted between the adjacent second 40 and third 42 panels. It is to be appreciated that the embodiments of the hinge described below are applicable to each of the first hinge 70, the second hinge 72, the third hinge 74, and the fourth hinge 76.

Still with reference to FIGS. 21-26, the hinge 70 has a body 122 formed of an elastomeric material and having first 124 and second 126 portions. The hinge 70 further has a first securing member 128 integral with and extending from the first portion 124 of the body 122, and has a second securing member 130 integral with and extending from the second portion 126 of the body 122. The first securing member 128 is engaged with one of the panels 40, 42, and the second securing member 130 is engaged with the other panel 40, 42. In the illustrated embodiment, the first securing member 128 is engaged with the second panel 40, and the second securing member 130 is engaged with the third panel 42.

Figure 21:
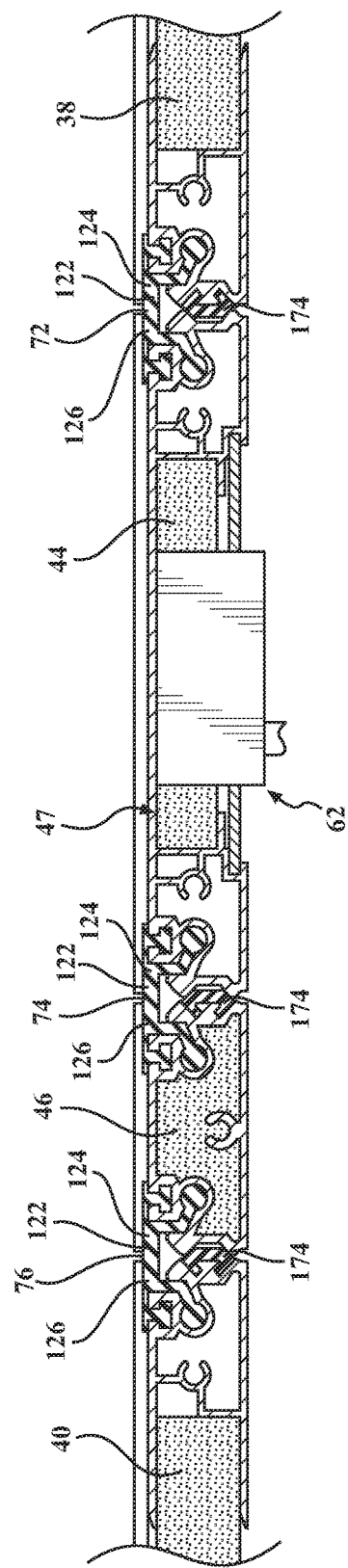
FIG. 21 is a cross-sectional view of the second panel pivotally coupled to the fourth panel by a hinge assembly, and the first panel pivotally coupled to the fourth panel by single hinge according to an embodiment of the present disclosure.

In the embodiment shown in FIGS. 21 and 22, each of the first 128 and second 130 securing members has a circular or substantially circular configuration. Alternatively, one or more of the first 128 and second 130 securing members can have a circular configuration, an oval configuration, a quadrilateral configuration, a diamond configuration, a heart-shaped configuration, a teardrop-shaped configuration, a triangular configuration, and/or the like, and/or combinations thereof. It is to be understood that the first 128 and second 130 securing members may have any configuration so long as the first 128 and second 130 securing members suitably mounted to the respective lower cavities 134, 138. In addition, the first 128 and second 130 securing members can have any suitable size. In the embodiment shown, the first 128 and second 130 securing members have the same or substantially same size. Alternatively, the size of the first securing member 128 can be different from the size of the second securing member 130.

As shown at least in FIGS. 21 and 22, the second panel 40 has an upper securing cavity 132 and a lower securing cavity 134, and the third panel 40 has an upper securing cavity 136 and a lower securing cavity 138. More particularly, the second panel 40 has the frame 47, and the upper 132 and lower 134 securing cavities are defined in the frame 47. Similarly, the third panel 42 has the frame 47, and the upper 136 and lower 138 securing cavities are defined in the frame 47. At least a portion of the first securing member 128 is disposed within the lower securing cavity 134 of the second panel 40, and at least a portion of the second securing member 130 is disposed within the lower securing cavity 138 of the third panel 42. To this end, the first securing member 128 is mounted to the lower securing cavity 134 of the second panel 40, and the second securing member 130 is mounted to the lower securing member 138 of the third panel 42.

The body 122 of the hinge 70 further has a first leg 140 with the first securing member 128 mounted to the first leg 140, and has a second leg 142 with the second securing member 130 mounted to the second leg 142. In an embodiment, and as shown, a portion of the first leg 140 is disposed within the lower securing cavity 134 of the second panel 40, and a portion of the second leg 142 is disposed within the lower securing cavity 138 of the third panel 42. In another embodiment, no portion of the first leg 140 is disposed within the lower securing cavity 134 of the second panel 40, and no portion of the second leg 142 is disposed within the lower securing cavity 138 of the third panel 42. To this end, the respective lower securing cavities 134, 138 receive only the first 128 and second 130 securing members.

The hinge 70 further has a third securing member 144 integral with and extending from the first portion 124 of the body 122, and a fourth securing member 146 integral with and extending from the second portion 126 of the body 122. In the embodiment shown, the body 122 has a first flange 148 extending from the first portion 124 with the third securing member 144 extending from the first flange 148, and has a second flange 150 extending from the second portion 126 with the fourth securing member 146 extending from the second portion 126. In an embodiment, the first 148 and second 150 flanges are integral with the body 122. In addition, the third securing member 144 is integral with the first flange 148, and the fourth securing member 146 is integral with the second flange 150. The first flange 148 extends from the first portion 124 of the body 122 in a first direction transverse to the width-wise axis $A_W$, and the second flange 150 extends from the second portion 126 of the body 122 in a second direction transverse to the width-wise axis $A_W$ with the second direction opposite the first direction. In addition, the first and second directions extend along the longitudinal axis $A_{LV}$ of the vehicle 14. The third securing member 144 extends from the first flange 148 in a third direction transverse to the longitudinal axis $A_{LV}$ and transverse to the width-wise axis $A_W$, and the fourth securing member 146 extends from the second flange 150 in a fourth direction transverse to the longitudinal axis $A_{LV}$ and transverse to the width-wise axis $A_W$.

As shown, the third direction that the third securing member 144 extends from the first flange 148 defines a first vertical axis $A_{V1}$, and the fourth direction that the fourth securing member 146 extends from the second flange 150 defines a second vertical axis $A_{V2}$. The first securing member 128 is aligned with the third securing member 144 along the first vertical axis $A_{V1}$, and the second securing member 130 is aligned with the fourth securing member 146 along the second vertical axis $A_{V2}$. In addition, the first securing member 128 is spaced from the third securing member 144, and the second securing member 130 is spaced from the fourth securing member 146.

Each of the third 144 and fourth 146 securing members has a neck portion 152 and a main portion 154 extending from the neck portion 152. As shown, the main portion 154 is larger in cross-section than the neck portion 152. In the illustrated embodiment, the main portion 154 has a rectangular configuration in cross-section. It is to be understood that the main portion 154 could have any configuration, such as a circular configuration, an oval configuration, a triangular configuration, a polygonal configuration, a heart-shaped configuration, a teardrop-shaped configuration, and/or the like, and/or combinations thereof. In addition, the main portion 154 of the third 144 and fourth 146 securing members can have any suitable size. In the embodiment shown, main portion 154 of the third 144 and fourth 146 securing members have the same or substantially same size. Alternatively, the size of the main portion 154 of the third securing member 144 can be different from the size of the main portion 154 of the fourth securing member 146. Furthermore, the neck portion 152 can have any suitable size and/or configuration. In the embodiment shown, the neck portion 152 of the third 144 and fourth 146 securing members have the same or substantially same size. Alternatively, the size of the neck portion 152 of the third securing member 144 can be different from the size of the neck portion 152 of the fourth securing member 146.

As previously mentioned, the second panel 40 has the upper securing cavity 132 defined in the frame 47, and the third panel 42 has the upper securing cavity 136 defined in the frame 47. As shown, the upper securing cavity 132 is defined in the frame 47 of the second panel 40 open to the upper or top surface 58 of the second panel 40, and the upper securing cavity 136 defined in the frame 47 of the third panel 42 open to the upper or top surface 58 of the third panel 42. At least a portion of the third securing member 144 is disposed within the upper securing cavity 132 defined the frame 47 of the second panel 40, and at least a portion of the fourth securing member 146 is disposed within the upper securing cavity 136 defined in the frame 47 of the third panel 42. As shown, the upper securing cavity 132 defined in the frame 47 of the second panel 40 is spaced from the lower securing cavity 134 defined in the frame 47 of the second panel 40. Similarly, the upper securing cavity 136 defined in the frame 47 of the third panel 42 is spaced from the lower securing cavity 138 defined in the frame 47 of the third panel 42.

Each of the upper cavities 132, 136 has a stem portion 156 and a chamber portion 158 with the chamber portion 158 being larger in cross-section than the stem portion 156. Typically, the stem portion 156 of the upper securing cavity 132 of the second panel 40 has substantially the same configuration as the neck portion 152 of the third securing member 144, and the stem portion 156 of the of the upper securing cavity 136 of the third panel 42 has substantially configuration as the neck portion 152 of the fourth securing member 146. In addition the stem portion 156 of the upper securing cavity 132 of the second panel 40 is slightly larger in cross-section compared to the neck portion 152 of the third securing member 144 so that the neck portion 152 of the third securing member 144 fits within the stem portion 156 of the upper securing cavity 132 of the second panel 40. Similarly, the stem portion 156 of the upper securing cavity 136 of the third panel 42 is slightly larger in cross-section compared to the neck portion 152 of the fourth securing member 146 so that the neck portion 152 of the fourth securing member 146 fits within the stem portion 156 of the upper securing cavity 136 of the third panel 42.

Additionally, the chamber portion 158 of the upper securing cavity 132 of the second panel 40 has substantially the same configuration as the main portion 154 of the third securing member 144, and the chamber portion 156 of the of the upper securing cavity 136 of the third panel 42 has substantially configuration as the neck portion 152 of the fourth securing member 146. In addition, the chamber portion 158 of the upper securing cavity 132 of the second panel 40 is slightly larger in cross-section compared to the main portion 154 of the third securing member 144 so that the main portion 154 of the third securing member 144 fits within the chamber portion 158 of the upper securing cavity 132 of the second panel 40. Similarly, the chamber portion 158 of the upper securing cavity 136 of the third panel 42 is slightly larger in cross-section compared to the main portion 154 of the fourth securing member 146 so that the main portion 154 of the fourth securing member 146 fits within the chamber portion 158 of the upper securing cavity 136 of the third panel 42.

The arrangement of the first 128 and third 144 securing members of the first portion 124 of the elastomeric body 122 defines a water path that is relatively complex. Similarly, the arrangement of the second 130 and fourth 146 securing members of the second portion 126 of the elastomeric body 122 defines a water path that is relatively complex. To this end, the water would have to make several turns (such as around the third securing member 144 and then around the first securing member 128) before finding its way through the interface between the body 122 of the hinge 70 and the panel (such as the second panel 40). As such, water leakage at the interface between the body 122 of the hinge 70 and the panels 40, 42 is reduced or even prevented, which contributes to improved water management of the tonneau cover system 10.

Figure 23:
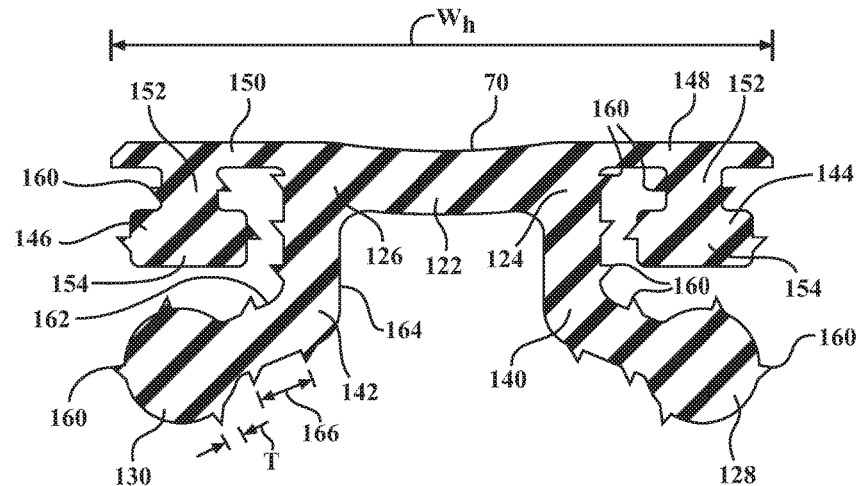
FIG. 23 is a cross-sectional view of a hinge according to another embodiment of the present disclosure.
Figure 24:
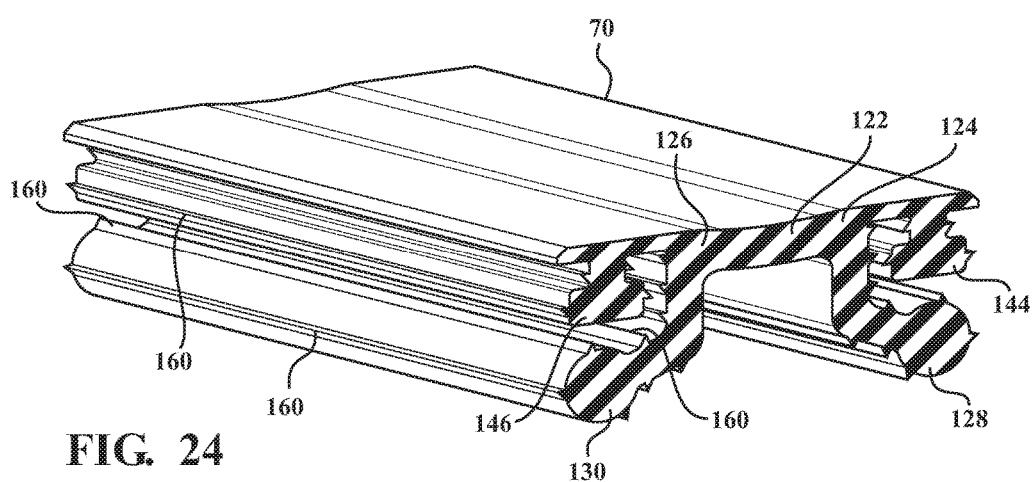
FIG. 24 is a cross-sectional, perspective view of the hinge of FIG. 23.

In the embodiment shown in FIGS. 21, 22, and 22A, each of the body 122, the first securing member 128, the second securing member 130, the third securing member 144, and the fourth securing member 146 of the hinge 70 has a substantially smooth surface. In another embodiment, and as shown in FIGS. 23 and 24, the hinge 70 further has a plurality of barbs 160 extending from the body 122 with the barbs 160 engaging the second 40 and third 42 panels to form a seal between the body 122 of the hinge 70 and the adjacent panels 40, 42. The seal formed at the interfaces between the body 122 and the panels 40, 42 also contributes to improved water management by preventing water (or other liquid) from leaking through these interfaces. The barbs 160 are also continuous along the width $W_h$ of the hinge 70. In the illustrated embodiments, the barbs 160 further extend from at least a portion of the first securing member 128, at least a portion of the second securing member 130, and combinations thereof. In the embodiment shown in FIG. 23, the barbs 160 further extend from a least a portion of the third securing member 144, at least a portion of the fourth securing member 146, and combinations thereof. In addition, and as shown in the embodiment depicted in FIG. 24, the plurality of barbs 160 are integral with the body 122, the first securing member 128, and the second securing member 130. As shown in the embodiment depicted in FIG. 23, the plurality of barbs 160 are integral with the body 122, the first securing member 128, the second securing member 130, the third securing member 144, and the fourth securing member 146.

In an embodiment, each of the barbs 160 has a common configuration. As shown in FIGS. 23 and 24, for example, each of the barbs 160 has a triangular configuration in cross-section. In another example, at least one of the barbs 160 has a triangular configuration in cross-section. In addition, the size of the barbs 160 may be the same or different. The barbs 160 may also be formed at selected positions along the body 122, the first securing member 128, the second securing member 130, the third securing member 144, and the fourth securing member 146. For instance, each of the first 140 and second 142 legs of the body 122 have exterior 162 and interior 164 surfaces, and the barbs 160 may be formed at least along the entire exterior surface 164 of each of the first 140 and second 142 legs and partially along the interior surface 162 of each of the first 140 and second 142 legs. The barbs 160 are also formed along each of the first 128 and second 130 securing members, and along the neck 152 and main 154 portions of each of the third 144 and fourth 146 securing members. Each of the barbs 160 may have a thickness T, and adjacent barbs 160 define a space 166 between the barbs 160 which is larger in cross-section than the thickness T of each of the barbs 160. In addition, the barbs 160 includes a series 168 of barbs 160, with the barbs 160 of the series 168 being equally spaced from one another. In the illustrated embodiment, the body 122 has multiple series 168 of barbs 160, with the barbs 160 of each of the series 168 being equally spaced from one another.

Figure 25:
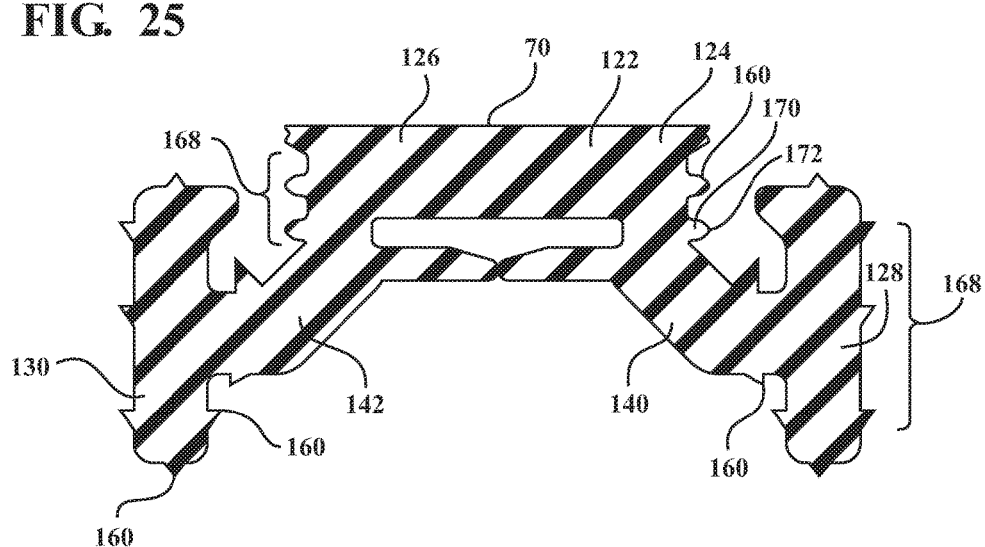
FIG. 25 is a cross-sectional view of a hinge according to yet another embodiment of the present disclosure.
Figure 26:
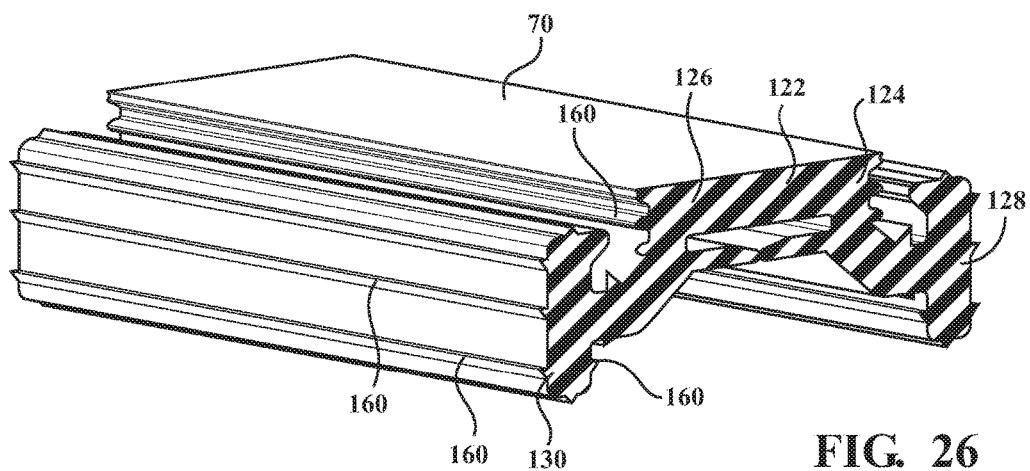
FIG. 26 is a cross-sectional, perspective view of the hinge of FIG. 25.

In another embodiment, at least one of the barbs 160 has a different configuration from another one of the barbs 160. For example, and as shown in FIGS. 25 and 26, at least one of the barbs 160 has a triangular configuration and at least one of the barbs 160 has a barb body 170 with a round configuration and a tip 172 extending from the barb body 170. For instance, and a shown, each of the first 124 and second 126 portions of the body 122 has a plurality of barbs 160 having the round barb body 170 and the tip 172, and the first leg 140, the second leg 142, the first securing member 128, and the second securing member 130 each have barbs 160 with a triangular configuration.

While specific embodiments of the configuration and/or distribution of the barbs 160 are shown in FIGS. 23-26, it is to be understood that the hinge 70 can alternatively have barbs 160 with any suitable configuration and/or distribution along the body 122 and securing members 128, 130, 144, 146. For instance, the barbs 160 could have any suitable configuration, such as the triangular or rounded configuration mentioned above, a rectangular configuration, a polygonal configuration, and/or the like. In addition, the hinge 70 could have one, two, three, or more different configurations of barbs 160 distributed or formed along at least a portion of the hinge 70. The different configurations of barbs 160 could be randomly formed along at least a portion of the hinge 70, formed in an alternating pattern along at least a portion of the hinge 70, formed in series along at least a portion of the hinge 70, etc.

In an embodiment, the tonneau cover system 10 further comprises a seal 174 extending along the width-wise axis $A_W$ of the vehicle 14. As shown at least in FIGS. 21 and 22, the seal 174 is disposed below the elastomeric body 122 of the hinge 70 between the first 128 and second 130 securing members. The seal 174 is formed from any suitable elastomeric material. In an example, the seal 174 is formed from the same material as the elastomeric body 122 of the hinges 70, 72, 74, 76. As shown, the seal 174 is located between adjacent panels, and is coupled to one of the adjacent panels and abuts the other of the adjacent panels.

While the invention has been described with reference to the examples above, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all examples falling within the scope of the appended claims.

What is claimed is:

1. A tonneau cover system comprising:
    a first side rail;
    a second side rail, where each of the first side rail and the second side rail are adapted to be mounted to a vehicle; and
    a plurality of panels coupled to the first side rail and the second side rail, where the plurality of panels comprise:
        a first panel;
        a second panel spaced from said first panel;
        a third panel adjacent said second panel;
        a spacer bar disposed between said first panel and the second panel with said spacer bar being fixed to said first side rail and said second side rail, the spacer bar including a channel;
        a mounting mechanism connected to the spacer bar, the mounting mechanism including:
            a housing disposed within the channel of the spacer bar, the housing having an opening and a closed end;
            a bracket pivotably connected to the housing so that the bracket is movable between a locked position where a portion of the bracket is located proximate to the closed end and a stowed position where a portion of the bracket is located within the opening;
        wherein said first panel is pivotally coupled to said spacer bar to enable said first panel to pivot relative to said spacer bar while said spacer bar remains fixed to said first side rail and said second side rail;
        wherein said third panel is pivotally coupled to said second panel to enable said third panel to pivot relative to said second panel and to permit said third panel to be located over said second panel while said spacer bar remains fixed to said side rails to define an intermediate folded position of said tonneau cover system; and
    a hinge assembly mounted between said second panel and said spacer bar to enable said second panel and said third panels to pivot relative to said spacer bar as a unit from said intermediate folded position to a final folded position located over said spacer bar and a portion of said first panel while said spacer bar remains fixed to said first side rails and said second side rail.

2. The tonneau cover system as set forth in claim 1 wherein said spacer bar is formed of a rigid material having a top surface and a bottom surface to define a panel configuration.

3. The tonneau cover system as set forth in claim 1, further comprising:
    a first hinge mounted to said second panel and said third panels to enable said third panel to pivot relative to said second panel; and
    a second hinge mounted to said first panel and said spacer bar to enable said first panel to pivot relative to said spacer bar.

4. The tonneau cover system as set forth in claim 1, wherein a portion of said hinge assembly is transverse to said spacer bar when said second panel and said third panel are in said final folded position.

5. The tonneau cover system as set forth in claim 4 wherein said hinge assembly includes a fifth panel, a third hinge mounted to said fifth panel and said spacer bar, and a fourth hinge mounted to said second and fifth panels with said fifth panel being transverse to said spacer bar when in said final folded position.

6. A tonneau cover system comprising:
    a first side rail;
    a second side rail, where each of the first side rail and the second side rail are adapted to be mounted to a vehicle; and
    a plurality of panels coupled to said first side rail and the second side rail, where the plurality of panels comprise:
        a first panel;
        a second panel spaced from said first panel;
        a third panel pivotally coupled to said second panel;
        a fourth panel disposed between said first panel and said second panels with said fourth panel being fixed to said first side rail and said second side rail, and including a polymeric core disposed between a top surface and a bottom surface; and
        a fifth panel;
    a first hinge mounted to said second panel and said third panels to enable said third panel to pivot relative to said second panel and to permit said third panel to be located over said second panel while said fourth panel remains fixed to said side rails to define an intermediate folded position of said cover;
    a second hinge mounted to said first panel and said fourth panels to enable said first panel to pivot relative to said fourth panel while said fourth panel remains fixed to said side rails;
    a hinge assembly having said fifth panel, said fifth panel being transverse to said fourth panel when in a final folded position,
    a third hinge mounted to said fourth panel and said fifth panel, and
    a fourth hinge mounted to said second panel and said fifth panels such that said hinge assembly is mounted between said second panel and said fourth panels to enable said second panel and said third panels to pivot relative to said fourth panel as a unit from said intermediate folded position to said final folded position located over said fourth panel and a portion of said first panel while said fourth panel remains fixed to said side rails.

7. The tonneau cover system as set forth in claim 6 wherein said first panel is pivotable relative to said fourth panel in a first direction and said third panel is pivotable relative to said fourth panel in a second direction opposite said first direction.

8. The tonneau cover system as set forth in claim 6 wherein said first panel is pivotable relative to said fourth panel in a first direction and said second and third panels are pivotable relative to said fourth panel in a second direction opposite said first direction.

9. A vehicle comprising:
a cargo bed having a header, a tailgate, opposing sides; and a plurality of panels coupled to said cargo bed comprising:
a first panel;
a second panel spaced from said first panel;
a third panel pivotally coupled to said second panel;
a fourth panel disposed between said first and second panels with said fourth panel being fixedly coupled to said opposing sides of said cargo bed, said fourth panel including a channel; and
a fifth panel;
a first hinge mounted to said second panel and said third panels to enable said third panel to pivot relative to said second panel and to permit said third panel to be located over said second panel while said fourth panel remains fixedly coupled to said opposing sides of said cargo bed to define an intermediate folded position of said cover;
a second hinge mounted to said first panel and said fourth panels to enable said first panel to pivot relative to said fourth panel while said fourth panel remains fixedly coupled to said opposing sides of said cargo bed;
a hinge assembly having said fifth panel, said fifth panel being transverse to said fourth panel when in a final folded position,
a third hinge mounted to said fourth and fifth panels,
a fourth hinge mounted to said second panel and said fifth panel so that said hinge assembly is mounted between said second panel and said fourth panels to enable said second panel and said third panel to pivot relative to said fourth panel as a unit from said intermediate folded position to a final folded position located over said fourth panel and a portion of said first panel while said fourth panel remains fixedly coupled to said opposing sides of said cargo bed;
a housing having an opening and a closed end; and
a mounting mechanism being movable between a locked position, where the mounting mechanism is connected to the first side rail and the second side rail, and a stowed position where the mounting mechanism extends into the opening in the housing and is stowed within the channel.

10. The vehicle as set forth in claim 9 wherein said first panel is pivotable between an opened position and a closed position with said first panel engaging said header when in said closed position and said first panel providing partial access to said cargo bed when said first panel is in said opened positioned.

11. The vehicle as set forth in claim 10 wherein said second panel and said third panels provide partial access to said cargo bed when in said intermediate folded position.

12. The vehicle as set forth in claim 9 wherein said second panel and said third panels provide partial access to said cargo bed when in said final folded position.

13. A tonneau cover apparatus for a vehicle comprising:
a plurality of panels; and
a hinge mounted to adjacent panels of said plurality of panels to enable one of said adjacent panels to pivot relative to another of said adjacent panels, with said hinge having:
a body formed of an elastomeric material; a first portion and a second portion extending outward from the body;
a first securing member integral with and extending from said first portion with said first securing member engaged with one of said adjacent panels;
a second securing member integral with and extending from said second portion with said second securing member engaged with another of said adjacent panels; and
a plurality of barbs extending from said first portion, said second portion, or both with said barbs engaging said adjacent panels to form a seal between said body of said hinge and said adjacent panels.

14. The tonneau cover apparatus as set forth in claim 13 wherein said plurality of barbs further extend from at least a portion of said first securing member, at least a portion of said second securing member, and combinations thereof.

15. The tonneau cover apparatus as set forth in claim 13 wherein said plurality of barbs are integral with at least one of said body, said first securing section, and said second securing section.

16. The tonneau cover apparatus as set forth in claim 13 wherein a series of said barbs are equally spaced from each other.

17. The tonneau cover apparatus as set forth in claim 13 wherein at least one of said plurality of barbs has a different configuration from another one of said plurality of barbs.

18. The tonneau cover apparatus as set forth in claim 13 wherein at least one of said plurality of barbs has a triangular configuration.

19. The tonneau cover apparatus as set forth in claim 13 wherein at least one of said plurality of barbs has a barb body with a round configuration and a tip extending from said barb body.

20. The tonneau cover apparatus as set forth in claim 13, wherein the hinge includes a third securing member extending from said first portion and a fourth securing member extending from said second portion.

* * * * *

UNITED STATES PATENT AND TRADEMARK OFFICE
CERTIFICATE OF CORRECTION

PATENT NO. : 10,189,339 B2
APPLICATION NO. : 15/536187
DATED : January 29, 2019
INVENTOR(S) : Scott Williamson et al.

Page 1 of 1

It is certified that error appears in the above-identified patent and that said Letters Patent is hereby corrected as shown below:

In the Claims

Column 21:
Lines 16-17, Claim 9 delete "third panels to enable" and replace with --third panel to enable--
Lines 23-24, Claim 9 delete "fourth panels to enable" and replace with --fourth panel to enable--
Line 33, Claim 9 delete "fourth panels to enable" and insert --fourth panel to enable--

Column 22:
Line 2, Claim 11 delete "third panels provide" and insert --third panel provide--

Signed and Sealed this
Twenty-third Day of April, 2019

Andrei Iancu
*Director of the United States Patent and Trademark Office*